US012078943B2

(12) United States Patent
Yamatani

(10) Patent No.: US 12,078,943 B2
(45) Date of Patent: Sep. 3, 2024

(54) IMAGE FORMING APPARATUS

(71) Applicant: CANON KABUSHIKI KAISHA, Tokyo (JP)

(72) Inventor: Mitsuru Yamatani, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/338,548

(22) Filed: Jun. 21, 2023

(65) Prior Publication Data

US 2023/0418187 A1 Dec. 28, 2023

(30) Foreign Application Priority Data

Jun. 24, 2022 (JP) ................................ 2022-102271

(51) Int. Cl.
*G03G 15/16* (2006.01)
*G03G 15/00* (2006.01)

(52) U.S. Cl.
CPC ......... *G03G 15/1605* (2013.01); *G03G 15/80* (2013.01)

(58) Field of Classification Search
CPC ............. G03G 15/1675; G03G 15/161; G03G 15/1605; G03G 15/1665; G03G 15/80
See application file for complete search history.

(56) References Cited

U.S. PATENT DOCUMENTS

2011/0076041 A1* 3/2011 Hyakutake ......... G03G 15/1675 399/101
2016/0334738 A1* 11/2016 Kochi ................ G03G 15/1675
2018/0246451 A1* 8/2018 Ito ...................... G03G 15/0131

FOREIGN PATENT DOCUMENTS

JP 2006047491 A 2/2006
JP 2013231960 A * 11/2013 ......... G03G 15/0131
JP 2018128613 A 8/2018
JP 2018141855 A 9/2018
JP 2019200282 A 11/2019
JP 2020034699 A 3/2020

* cited by examiner

*Primary Examiner* — Jessica L Eley
(74) *Attorney, Agent, or Firm* — Canon U.S.A., Inc. IP Division

(57) ABSTRACT

An image forming apparatus includes an image bearing member, an intermediate transfer belt, and current supply devices. If (i) a current balance of a current supplied to the intermediate transfer belt is Ia-Ib where Ia is a sum of current densities of positive currents supplied from an outer to an inner peripheral surface of the intermediate transfer belt and Ib is a sum of current densities of positive currents supplied from the inner to the outer peripheral surface and (ii) an electric resistance of the intermediate transfer belt relative to the current balance is larger when the current balance is a negative of a predetermined value than when it is a positive of the predetermined value, a control unit performs constant current control on a discharge current supplied to the intermediate transfer belt during a print job such that, based on current supply detection, the current balance is positive.

23 Claims, 11 Drawing Sheets

IMAGE FORMING APPARATUS

BACKGROUND

Field

The present disclosure relates to an image forming apparatus such as a copying machine, a printer, or a facsimile machine using an electrophotographic system or an electrostatic recording system.

Description of the Related Art

In the related art, as an image forming apparatus using an electrophotographic system or the like, there is an image forming apparatus employing an intermediate transfer system in which toner images formed on a plurality of image bearing members are primarily transferred onto an intermediate transfer member and then secondarily transferred onto a recording material such as paper. As the intermediate transfer member, an intermediate transfer belt formed of an endless belt (hereinafter, also simply referred to as "belt") is widely used. In an example, Japanese Patent Laid-Open No. 2020-034699 discloses a discharge device having a discharge member that abuts against the intermediate transfer belt to receive ions from the intermediate transfer belt.

The primary transfer is often performed by applying a primary transfer voltage to a primary transfer member provided to be contactable with the inner peripheral surface of the intermediate transfer belt in correspondence with each of the plurality of image bearing members and supplying a primary transfer current to a primary transfer portion where the image bearing member and the intermediate transfer belt abut against each other. The secondary transfer is often performed by applying a secondary transfer voltage to a secondary transfer member provided to be contactable with the outer peripheral surface of the intermediate transfer belt and supplying a secondary transfer current to a secondary transfer portion where the intermediate transfer belt and the secondary transfer member abut against each other.

Deposits such as toner (secondary transfer residual toner) remaining on the intermediate transfer belt after the secondary transfer step are removed and collected from the intermediate transfer belt by a belt cleaning device as an intermediate transfer member cleaner. As the belt cleaning device, an electrostatic cleaning device that electrostatically collects toner on the intermediate transfer belt is known. The cleaning by this device is performed, for example, by applying a cleaning voltage to a cleaning member provided to be contactable with the outer peripheral surface of the intermediate transfer belt and supplying a cleaning current to a cleaning portion where the intermediate transfer belt and the cleaning member abut against each other.

In addition, for example, in a commercial printing market, an intermediate transfer belt including an elastic layer may be used. Since the intermediate transfer belt includes the elastic layer, it is possible to improve transferability to a recording material having an uneven surface, such as embossed paper.

In the image forming apparatus of the intermediate transfer system, there is an issue of an increase in the electric resistance of the intermediate transfer belt having many energizing portions as described above. This is remarkable in a case where the intermediate transfer belt includes the elastic layer and an ion-conductive type electroconductive material (ion-conductive material) is used for adjusting the electric resistance of the elastic layer.

In an ion-conductive belt containing the ion-conductive material, cations and anions causing the ion conductivity receive a force due to an electric field generated in the belt when a current flows. The positively charged cations move in the direction of the electric field, and the negatively charged anions move in the direction opposite to the electric field. For example, a case of a configuration in which toner whose normal charge polarity is the negative polarity is used will be considered. In this case, for the primary transfer, a positive voltage is applied to the primary transfer member abutting against the inner peripheral surface of the intermediate transfer belt, and a positive current is supplied in the direction from the inner peripheral surface side to the outer peripheral surface side of the intermediate transfer belt (hereinafter, also referred to as "outward direction") in the primary transfer portion. As a result, the cations move to the outer peripheral surface side of the intermediate transfer belt, and the anions move to the inner peripheral surface side of the intermediate transfer belt. In addition, for the secondary transfer, a positive voltage is applied to the secondary transfer member abutting against the outer peripheral surface of the intermediate transfer belt, and a positive current is supplied in the direction from the outer peripheral surface side to the inner peripheral surface side of the intermediate transfer belt (hereinafter, also referred to as "inward direction") in the secondary transfer portion. As described above, since the electric field in the direction opposite to that in the primary transfer portion is generated in the secondary transfer portion, the ions in the intermediate transfer belt at the time of the secondary transfer move in the direction opposite to that at the time of the primary transfer (the cations move to the inner peripheral surface side, and the anions move to the outer peripheral surface side). When the balance between the total amount of charges in the outward direction and the total amount of charges in the inward direction, which are supplied to the intermediate transfer belt, is largely lost, the ions in the intermediate transfer belt are unevenly distributed, and the electric resistance of the intermediate transfer belt increases. When the electric resistance of the intermediate transfer belt increases due to use and the voltage required to be applied for the primary transfer or the secondary transfer increases (the absolute value increases), an image defect caused by electric discharge in the primary transfer portion or the secondary transfer portion is likely to occur.

In order to suppress an increase in the electric resistance of the intermediate transfer belt and extend the endurance life of the intermediate transfer belt, a configuration using a conventional discharge device has been proposed. In the conventional discharge device, for example, a discharge member such as a conductive fur brush roller is made to abut against the intermediate transfer belt, and a discharge current is supplied to the intermediate transfer belt so as to balance the ions in the intermediate transfer belt by the discharge member. For example, in a tandem-type full-color image forming apparatus using toner whose normal charge polarity is the negative polarity, a positive current is supplied in the outward direction at four primary transfer portions, and a positive current is supplied in the inward direction at one secondary transfer portion. In this case, since the supply of the positive current in the outward direction increases, it is desirable to supply the discharge current of the positive polarity in the inward direction by the discharge member. In the configuration having the electrostatic cleaning device, the current supplied by the cleaning portion is also considered.

Here, in general, a value obtained by subtracting the sum of positive currents supplied in the direction (outward direction) from the inner peripheral surface side to the outer peripheral surface side of the intermediate transfer belt from the sum of positive currents supplied in the direction (inward direction) from the outer peripheral surface side to the inner peripheral surface side of the intermediate transfer belt is set as a current balance. In this case, it is possible to set a discharge current that makes the current balance zero. For example, the discharge current that makes the current balance zero can be set on the basis of target values or detection results of the primary transfer current, the secondary transfer current, and the cleaning current.

However, a power source device of the discharge current has a certain variation (fluctuation) in its output value due to individual variation. Therefore, even if the output of the power source device is controlled such that the current balance becomes zero, the actual current balance may deviate to the positive side or the negative side. It has been found that there is a difference in an increase in the electric resistance of the intermediate transfer belt between when the current balance is positive and when the current balance is negative. Although the detailed mechanism is unknown, it is considered that this is because the ion-conductive material includes an ion-conductive material in which negative ions easily move and an ion-conductive material in which positive ions easily move. Therefore, even if the discharge member is provided as a countermeasure against the increase in the electrical resistance of the intermediate transfer belt, the current balance is integrated on the side on which the increase in the electrical resistance of the intermediate transfer belt becomes larger, and on the side on which the increase in the electrical resistance becomes larger when the current balance deviates from zero. For this reason, a desired effect may not be obtained.

SUMMARY

Therefore, the present disclosure is directed to suppressing an increase in the electric resistance of the intermediate transfer belt even if the output value varies due to the individual difference of the discharge power source.

According to an aspect of the present disclosure, an image forming apparatus includes an image bearing member configured to bear a toner image, an intermediate transfer belt that is rotatable, endless, and onto which the toner image is to be transferred from the image bearing member, and a plurality of current supply devices capable of supplying currents to the intermediate transfer belt, wherein the plurality of current supply devices includes a first current supply device including a primary transfer member configured to primarily transfer the toner image from the image bearing member onto the intermediate transfer belt by supplying a primary transfer current to the intermediate transfer belt at a primary transfer portion, a first power source configured to apply a voltage to the primary transfer member, and a first detecting unit configured to detect a current supplied from the first power source; a second current supply device including a secondary transfer member configured to secondarily transfer the toner image from the intermediate transfer belt onto a recording material by supplying a secondary transfer current to the intermediate transfer belt at a secondary transfer portion, a second power source configured to apply a voltage to the secondary transfer member, and a second detecting unit configured to detect a current supplied from the second power source; a third current supply device including a discharge member configured to supply a discharge current to the intermediate transfer belt at a discharge portion downstream of the secondary transfer portion and upstream of the primary transfer portion in a rotation direction of the intermediate transfer belt, a third power source configured to supply a current to the discharge member, and a third detecting unit configured to detect the current supplied from the third power source; and a control unit configured to control the plurality of current supply devices, wherein, among currents supplied by the plurality of current supply devices at an image forming time, if Ia is a sum of current densities of positive currents, per unit length of the intermediate transfer belt in a width direction in regions where the currents are supplied by the plurality of current supply devices at the image forming time, supplied in a direction from an outer peripheral surface side of the intermediate transfer belt to an inner peripheral surface side of the intermediate transfer belt, Ib is a sum of current densities of positive currents, per unit length of the intermediate transfer belt in the width direction in the regions where the currents are supplied by the plurality of current supply devices at the image forming time, supplied in a direction from the inner peripheral surface side to the outer peripheral surface side of the intermediate transfer belt, and a value of Ia−Ib is a value of a current balance of a current supplied to the intermediate transfer belt, an electric resistance of the intermediate transfer belt with respect to the current balance is larger when the value of the current balance is a negative value of a predetermined value than when the value of the current balance is a positive value of the predetermined value, and wherein, during execution of a print job of continuous image formation in which the toner image is continuously transferred onto a plurality of recording materials, the control unit performs constant current control on the discharge current such that, based on a detection result detected by the first detecting unit during the print job and a detection result detected by the second detecting unit during the print job, the current balance is positive.

Further features of the present disclosure will become apparent from the following description of exemplary embodiments with reference to the attached drawings.

DESCRIPTION OF THE EMBODIMENTS

Hereinafter, image forming apparatuses according to embodiments of the present disclosure will be described in detail with reference to the drawings. In an example, among positive currents per unit length of regions on an intermediate transfer belt at an image forming time, a current balance is obtained by subtracting a sum of the positive currents supplied in an outward direction from a sum of the positive currents supplied in an inward direction. An electric resistance of the intermediate transfer belt, which is a predetermined value or less, with respect to the current balance satisfies |Sb|>|Sa|. Sa and Sb are ratios of changes in the electric resistance of the intermediate transfer belt with respect to changes in positive and negative current balances, respectively. A control unit in an image forming apparatus controls a discharge power source such that an average value of the current balance is positive when image formation is continuously performed on a predetermined number of sheets of a recording material during a job of continuous image formation.

First Embodiment

1. Overall Configuration and Operation of Image Forming Apparatus

Figure 1:
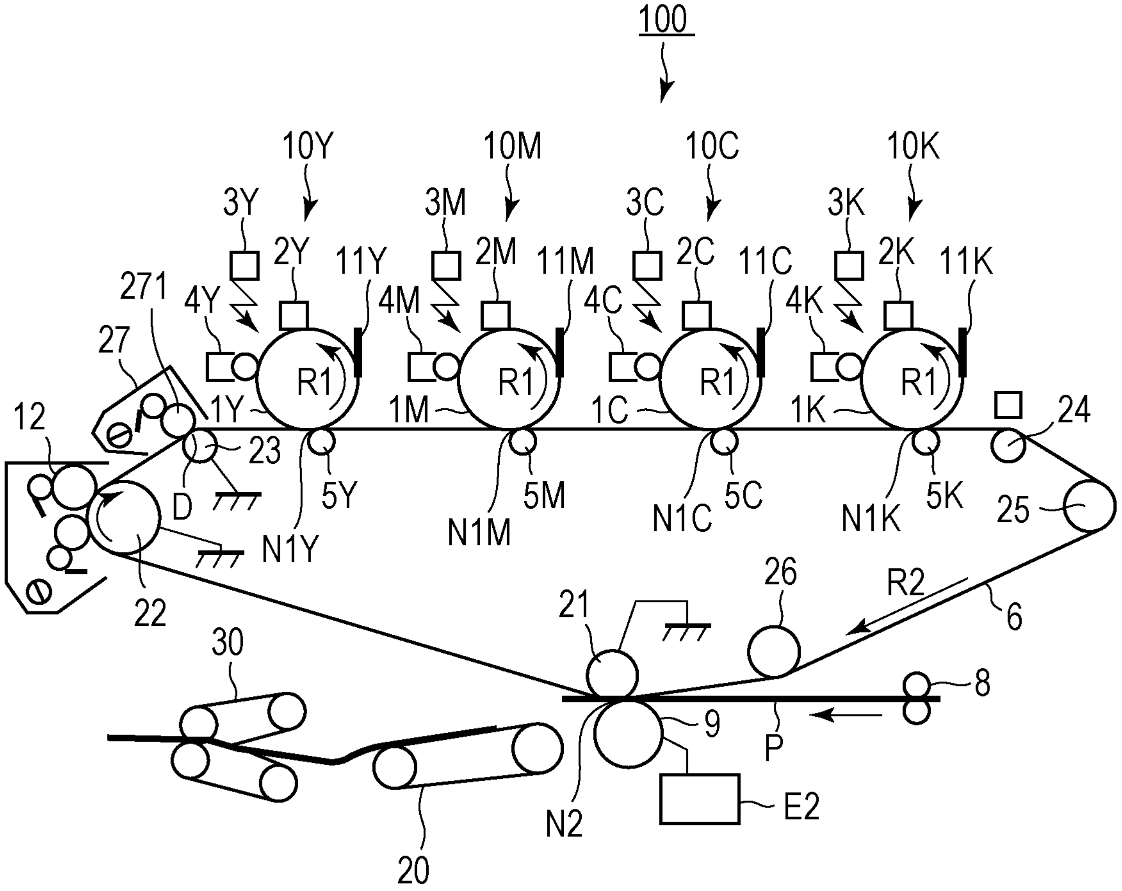
FIG. 1 is a schematic sectional view of an image forming apparatus.

FIG. 1 is a schematic sectional view of an image forming apparatus 100 of this embodiment. The image forming apparatus 100 of this embodiment is a tandem-type printer employing an intermediate transfer system and capable of forming a full-color image using an electrophotographic system.

The image forming apparatus 100 includes four image forming portions (stations) 10Y, 10M, 10C, and 10K for forming images of yellow (Y), magenta (M), cyan (C), and black (K), respectively. Elements having identical or corresponding functions or configurations in the image forming portions 10Y, 10M, 10C, and 10K may be collectively described by omitting the suffixes Y, M, C, and K of the reference numerals representing the elements for the respective colors. In this embodiment, the image forming portion 10 includes a photosensitive drum 1, a charging device 2, an exposing device 3, a developing device 4, a primary transfer roller 5, a drum cleaning device 11, and the like, which will be described later.

The photosensitive drum 1, which is a rotatable drum-shaped (cylindrical) photosensitive member (electrophotographic photosensitive member) as an image bearing member for bearing a toner image, is rotatably driven at a predetermined circumferential speed in an arrow R1 direction (counterclockwise direction) in the drawing. The surface of the rotating photosensitive drum 1 is uniformly charged to a predetermined potential of a predetermined polarity (negative polarity in this embodiment) by the charging device 2 as a charger. During the charging process, a predetermined charging voltage (charging bias) is applied to the charging device 2. The charged surface of the photosensitive drum 1 is subjected to scanning exposure on the basis of image information by the exposing device (laser beam scanner) 3 as an exposing unit, so that an electrostatic image (electrostatic latent image) corresponding to target image information is formed on the photosensitive drum 1. The exposing device 3 outputs laser light which is on/off-modulated in accordance with the image information input from an external device such as an image scanner or a computer, and scans and exposes the charged surface of the photosensitive drum 1. The electrostatic image formed on the photosensitive drum 1 is developed (visualized) by being supplied with toner as a developer by the developing device 4 as a developing unit, so that a toner image is formed on the photosensitive drum 1. In this embodiment, the toner charged to the same polarity (negative polarity in this embodiment) as the charge polarity of the photosensitive drum 1 is deposited on the exposure portion (image portion) on the photosensitive drum 1 in which the absolute value of the potential is lowered by the exposure on the basis of the image information after the uniform charging process (reversal developing system). In this embodiment, the normal charge polarity of the toner, which is the main charge polarity of the toner at the time of development, is the negative polarity. At the time of development, a predetermined developing voltage (developing bias) is applied to a developing roller as a developer bearing member (developing member) provided in the developing device 4.

Opposed to four photosensitive drums 1, an intermediate transfer belt 6 constituted by an endless belt as an intermediate transfer member is provided. The intermediate transfer belt 6 is disposed to be contactable with the surfaces of the four photosensitive drums 1. The intermediate transfer belt 6 is stretched around first to sixth stretching rollers 21 to 26 serving as a plurality of stretching rollers with a predetermined tension. In this embodiment, the first stretching roller 21 is a secondary transfer opposed roller (secondary transfer inner roller) functioning as an opposed member (counter electrode) of a secondary transfer roller 9, which will be described later. The second stretching roller 22 is a driving roller for the intermediate transfer belt 6. Furthermore, the third and fourth stretching rollers 23 and 24 are first and second auxiliary rollers for forming an image transfer surface of the intermediate transfer belt 6 onto which the toner images are primarily transferred from the photosensitive drums 1 as described later. The fifth stretching roller 25 is a tension roller configured to control the tension of the intermediate transfer belt 6 to be substantially constant.

The sixth stretching roller 26 is a pre-secondary-transfer roller that forms a surface of the intermediate transfer belt 6 entering a secondary transfer portion (secondary transfer nip, secondary transfer position) N2, which will be described later. A driving force is input to the intermediate transfer belt 6 by the driving roller 22 being rotatably driven, and the intermediate transfer belt 6 rotates (circularly moves) at a circumferential speed of 150 to 470 mm/sec in an arrow R2 direction (clockwise direction) in the drawing. On the inner peripheral surface (back surface) side of the intermediate transfer belt 6, primary transfer rollers 5Y, 5M, 5C, and 5K, which are roller-type primary transfer members (current supply members) as a primary transfer unit, are provided in correspondence with the photosensitive drums 1Y, 1M, 1C, and 1K, respectively. The primary transfer roller 5 is pressed against the photosensitive drum 1 via the intermediate transfer belt 6 to form a primary transfer portion (primary transfer nip portion, primary transfer position) N1 where the photosensitive drum 1 and the intermediate transfer belt 6 abut against (in contact with) each other.

The toner image formed on the photosensitive drum 1 as described above is transferred (primarily transferred) onto the rotating intermediate transfer belt 6 by the action of the primary transfer roller 5 at the primary transfer portion N1. At the time of primary transfer, to the primary transfer roller 5, a primary transfer voltage (primary transfer bias), which is a DC voltage controlled to a constant voltage of the opposite polarity (positive polarity in this embodiment) of the normal charge polarity of the toner, is applied by a primary transfer voltage source (high voltage source) E1 (in FIG. 8). As a result, the primary transfer current is supplied to the primary transfer portion N1. For example, at the time of the primary transfer, a primary transfer voltage controlled to a constant voltage of about +1 to +3 kilovolts (kV) is applied to each primary transfer roller 5, and a current of about +20 to +100 microamperes (μA) flows in the outward direction at each primary transfer portion N1. For example, when a full-color image is formed, the toner images of the respective colors of yellow, magenta, cyan, and black formed on the respective photosensitive drums 1 are sequentially transferred onto the intermediate transfer belt 6 in a superimposed manner. In this embodiment, the primary transfer voltage is applied to each primary transfer roller 5 in synchronization with the conveyance of the toner image of each color to the primary transfer portion N1. In this embodiment, the primary transfer roller 5 is constituted by a core metal (base material) and an elastic layer formed of an ion-conductive foamed rubber on the outer periphery of the core metal. In this embodiment, the outer diameter of the primary transfer roller 5 is 15 to 20 mm. Furthermore, in this embodiment, the electric resistance value of the primary transfer roller 5 is from $1\times10^5$ to $1\times10^8\Omega$ when measured by applying a voltage of 2 kV in an N/N environment (23° C., 50% RH).

On the outer peripheral surface side of the intermediate transfer belt 6, the secondary transfer roller (secondary transfer outer roller) 9, which is a roller-type secondary transfer member (current supply member) as a secondary transfer unit, is disposed at a position opposed to the secondary transfer opposed roller 21. The secondary transfer roller 9 is pressed against the secondary transfer opposed roller 21 via the intermediate transfer belt 6 to form the secondary transfer portion (secondary transfer nip, secondary transfer position) N2 where the intermediate transfer belt 6 and the secondary transfer roller 9 abut against each other (in direct contact each other or with a recording material P interposed therebetween). The toner image formed on the intermediate transfer belt 6 as described above is transferred (secondarily transferred) onto the recording material P sandwiched and conveyed between the intermediate transfer belt 6 and the secondary transfer roller 9 by the action of the secondary transfer roller 9 at the secondary transfer portion N2. In this embodiment, the secondary transfer roller 9 is constituted by a core metal (base material) and an elastic layer formed of an ion-conductive foamed rubber on the outer periphery of the core metal. In this embodiment, the outer diameter of the secondary transfer roller 9 is 20 to 25 mm. Furthermore, in this embodiment, the electric resistance value of the secondary transfer roller 9 is from $1\times10^5$ to $1\times10^8\Omega$ when measured by applying a voltage of 2 kV in an N/N environment (23° C., 50% RH). In this embodiment, the secondary transfer opposed roller 21 is constituted by a core metal (base material) and an elastic layer formed of an electroconductive rubber on the outer periphery of the core metal. In this embodiment, the outer diameter of the secondary transfer opposed roller 21 is 20 to 22 mm. Furthermore, in this embodiment, the electric resistance value of the secondary transfer opposed roller 21 is from $1\times10^5$ to $1\times10^8\Omega$ when measured by applying a voltage of 50 V in an N/N environment (23° C., 50% RH).

At the time of secondary transfer, to the secondary transfer roller 9, a secondary transfer voltage (secondary transfer bias), which is a DC voltage controlled to a constant voltage of the opposite polarity (positive polarity in this embodiment) of the normal charge polarity of the toner, is applied by a secondary transfer voltage source (high voltage source) E2. As a result, the secondary transfer current is supplied to the secondary transfer portion N2. For example, at the time of the secondary transfer, a secondary transfer voltage controlled to a constant voltage of about +1 to +7 kV is applied to the secondary transfer roller 9, and a current of about +40 to +120 μA flows in the inward direction at the secondary transfer portion N2. In this embodiment, the secondary transfer opposed roller 21 is electrically grounded (connected to the ground). The recording material (transfer material, recording medium, sheet) P is accommodated in a recording material accommodating portion (not illustrated) such as a feeding cassette. The recording material P is fed one by one from the recording material accommodating portion by a feeding member (not illustrated) such as a feeding roller being driven in response to a feeding start signal. Subsequently, the recording material P is conveyed to the secondary transfer portion N2 by a registration roller 8. The registration roller 8 is controlled to convey the recording material P to the secondary transfer portion N2 in synchronization with the timing at which the leading edge of the toner image on the intermediate transfer belt 6 reaches the secondary transfer portion N2. The recording material P is typically paper, but may be a resin sheet (film) such as synthetic paper or an overhead projector (OHP) sheet. Note that an inner roller corresponding to the secondary transfer opposed roller 21 in this embodiment may also be used as a secondary transfer member (current supply member), and a voltage of the opposite polarity of the voltage applied to the secondary transfer roller 9 in this embodiment may also be applied thereto. In this case, the outer roller corresponding to the secondary transfer roller 9 in this embodiment may be used as the opposed member and may be electrically grounded.

The recording material P on which the toner image is transferred is separated from the intermediate transfer belt 6 and is conveyed to a fixing device 30 as a fixing unit by a pre-fixing conveying device 20. The pre-fixing conveying device 20 includes an endless belt member, which is rotatable, formed of a rubber material such as ethylene-propylene terpolymer (EPDM), which is 100 to 110 mm wide and 1 to 3 mm thick, at a central portion in a direction substantially orthogonal to the conveying direction of the recording material P, and conveys the recording material P placed thereon. The belt member is provided with holes having diameters of 3 to 7 mm, and air is sucked from the inside of the belt member. As a result, the carrying force of the recording material P by the belt member is increased, so that the conveying property of the recording material P is stabilized. By a fixing rotary member pair, the fixing device 30 fixes (melts and fixes) the toner image on the recording material P by heating and pressing the recording material P carrying the unfixed toner image. The recording material P on which the toner image is fixed is ejected (output) to the outside of the apparatus main body of the image forming apparatus 100.

The toner (primary transfer residual toner) remaining on the photosensitive drum 1 without being transferred onto the intermediate transfer belt 6 at the time of the primary transfer is removed and collected from the photosensitive drum 1 by the drum cleaning device 11 as a photosensitive member cleaner. Deposits such as the toner (secondary transfer residual toner) remaining on the intermediate transfer belt 6 without being transferred onto the recording material P at the time of the secondary transfer are removed and collected from the intermediate transfer belt 6 by a belt cleaning device 12 as an intermediate transfer member cleaner. The belt cleaning device 12 will be described later in more detail. In this embodiment, the belt cleaning device 12 electrostatically collects the secondary transfer residual toner on the intermediate transfer belt 6.

2. Intermediate Transfer Member

Figure 4:
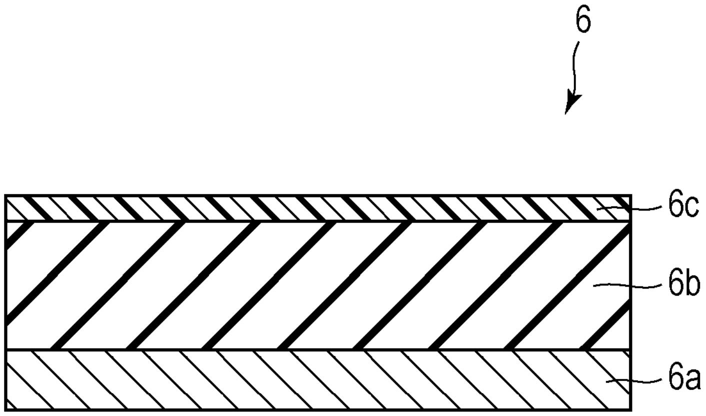
FIG. 4 is a schematic sectional view of an intermediate transfer belt.

FIG. 4 is a schematic sectional view of the intermediate transfer belt 6 in this embodiment. In this embodiment, the intermediate transfer belt 6 is constituted by a base layer (layer forming the inner peripheral surface) 6*a*, an elastic layer (intermediate layer) 6*b*, and a surface layer (layer forming the outer peripheral surface) 6*c*. The base layer 6*a* is formed of a material containing an appropriate amount of carbon black as an anti-static additive in a resin such as polyimide or polycarbonate or various rubbers, and is 0.05 to 0.15 [mm] thick. The elastic layer 6*b* is formed of a material containing an appropriate amount of an ion-conductive material in various rubbers such as chloroprene rubber (CR rubber), urethane rubber, and silicone rubber, and is 0.1 to 0.500 [mm] thick. The material of the elastic layer 6*b* may be, for example, a material obtained by mixing an ion-conductive polymer with a system containing a halogen-containing non-conductive polymer such as chloroprene rubber as a main component to adjust the electric resistance. The ion-conductive polymer may be a copolymer containing at least one of epichlorohydrin, ethylene oxide, propylene oxide, and allyl glycidyl ether and having a main chain and/or a side chain in which ether bonds are regularly arranged. The surface layer 6*c* is formed of a resin such as urethane resin or fluororesin, and is 0.0002 to 0.020 [mm] thick.

In this embodiment, the intermediate transfer belt 6 has a volume resistivity of $5\times10^8$ to $1\times10^{14}$ [Ω·cm] (23° C., 50% RH). The hardness of the intermediate transfer belt 6 is 60 to 85° (23° C., 50% RH) in MD-1 hardness. In addition, the coefficient of static friction of the intermediate transfer belt 6 is 0.15 to 0.6 (23° C., 50% RH, type 94i manufactured by HEIDON Shinto Scientific Co. Ltd.).

3. Belt Cleaning Device

Figure 2:
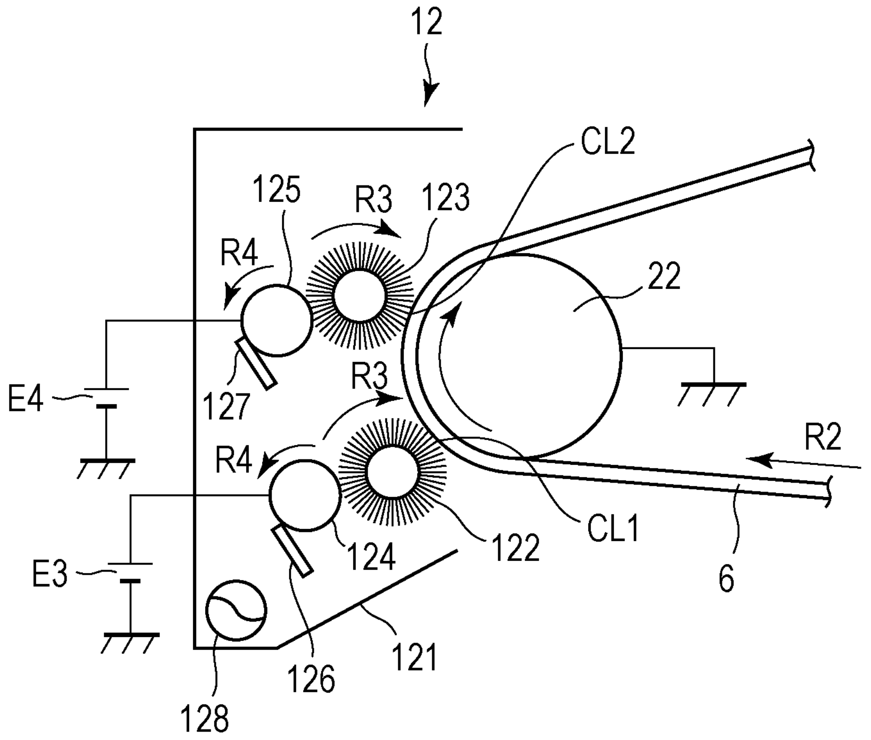
FIG. 2 is a schematic sectional view of a belt cleaning device and a vicinity thereof.

FIG. 2 is a schematic enlarged sectional view of the belt cleaning device 12 and a vicinity thereof in this embodiment. The belt cleaning device 12 is disposed downstream of the secondary transfer portion N2 and upstream of the primary transfer portion N1 (the most upstream primary transfer portion N1Y) in the rotation direction of the intermediate transfer belt 6, in particular, at a position opposed to the driving roller 22 via the intermediate transfer belt 6. In this embodiment, the belt cleaning device 12 is constituted by an electrostatic cleaning device for electrostatically collecting the toner on the intermediate transfer belt 6, in particular, an electrostatic brush cleaning device using a conductive fur brush roller.

In this embodiment, the belt cleaning device 12 has a housing 121 disposed near the intermediate transfer belt 6. The following members are provided inside the housing 121. First, first and second cleaning brushes 122 and 123 as first and second cleaning members (current supply members) are provided. In addition, first and second collecting rollers 124 and 125 as first and second collecting members are provided. Furthermore, first and second blades 126 and 127 as first and second scraping members are provided.

The first and second cleaning brushes 122 and 123 are constituted by rotatable conductive fur brush rollers. The brush fibers of the first and second cleaning brushes 122 and 123 are made of carbon-dispersed nylon fibers, acrylic fibers, or polyester fibers having an electric resistance of $3\times10^5$ to $1\times10^{13}$ (Ω/cm) and a fiber thickness of 2 to 15 deniers. The first and second cleaning brushes 122 and 123 are formed by flocking the brush fibers on a metal roller as a base material at a flocking ratio of 50000 to 500000 fibers/inch$^2$. The first and second cleaning brushes 122 and 123 are disposed with a penetration amount of about 1.0 to 2.0 mm with respect to the intermediate transfer belt 6. In addition, the first and second cleaning brushes 122 and 123 are rotatably driven by a driving motor (not illustrated) as a driver in an arrow R3 direction (clockwise direction) in the drawing at a circumferential speed of 20 to 80% of the circumferential speed of the intermediate transfer belt 6. That is, the first and second cleaning brushes 122 and 123 rotate so as to move in the direction opposite to the moving direction of the intermediate transfer belt 6 at the portion abutting against the intermediate transfer belt 6, and rub the surface of the intermediate transfer belt 6. In this embodiment, the first and second cleaning brushes 122 and 123 are made to abut against the driving roller 22 functioning as an opposed member via the intermediate transfer belt 6. The driving roller 22 is electrically grounded. The first and second cleaning brushes 122 and 123 are disposed such that the rotational axis directions thereof are substantially parallel to a direction (also referred to as "width direction") substantially orthogonal to the moving direction of the surface of the intermediate transfer belt 6. The length of each of the first and second cleaning brushes 122 and 123 in the rotational axis direction is longer than a maximum image forming width on the intermediate transfer belt 6 in the width direction of the intermediate transfer belt 6. The portion where the first cleaning brush 122 and the intermediate transfer belt 6 abut against each other is a first cleaning portion (first cleaning position) CL1 where the first cleaning brush 122 collects the toner from the intermediate transfer belt 6. The portion where the second cleaning brush 123 and the intermediate transfer belt 6 abut against each other is a second cleaning portion (second cleaning position) CL2 where the second cleaning brush 123 collects the toner from the intermediate transfer belt 6. The first and second cleaning portions CL1 and CL2 are positioned downstream of the secondary transfer portion N2 and upstream of the primary transfer portion N1 (the most upstream primary transfer portion N1Y) in the rotation direction of the intermediate transfer belt 6. Furthermore, in this embodiment, the first cleaning portion CL1 is positioned upstream of the second cleaning portion CL2 in the rotation direction of the intermediate transfer belt 6.

The first and second collecting rollers 124 and 125 are constituted by rotatable rollers (metal rollers) made of metal (made of aluminum in this embodiment). The first and second collecting rollers 124 and 125 are disposed with a penetration amount of about 1.5 to 2.5 mm with respect to the first and second cleaning brushes 122 and 123. In addition, the first and second collecting rollers 124 and 125 are rotatably driven by a driving motor (not illustrated) as a driver in an arrow R4 direction (counterclockwise direction) in the drawing at a circumferential speed equal to that of the first and second cleaning brushes 122 and 123. That is, the first and second collecting rollers 124 and 125 rotate so as to move in the same direction as the moving direction of the first and second cleaning brushes 122 and 123 at the portions where the first and second collecting rollers 124 and 125 abut against the first and second cleaning brushes 122 and 123. The first and second collecting rollers 124 and 125 are disposed such that the rotational axis direction thereof is substantially parallel to the width direction of the intermediate transfer belt 6. The length of each of the first and second collecting rollers 124 and 125 in the rotational axis direction is equal to the length of each of the first and second cleaning brushes 122 and 123 in the rotational axis direction.

The first and second blades 126 and 127 are disposed to abut against the first and second collecting rollers 124 and 125. The first and second blades 126 and 127 are formed of a rubber material such as urethane rubber as an elastic member. Each of the first and second blades 126 and 127 is a plate-like member having a predetermined length in each of the longitudinal direction disposed substantially parallel to the rotational axis direction of each of the first and second collecting rollers 124 and 125 and the lateral direction substantially perpendicular to the longitudinal direction, and having a predetermined thickness. Each of the first and second blades 126 and 127 has a thickness of 1.6 to 2.2 mm and a hardness of 70 to 780 (23° C., 50% RH) in International Rubber Hardness Degrees (IRHD) hardness. The first and second blades 126 and 127 are disposed with a penetration amount of about 0.5 to 2.0 mm with respect to the first and second collecting rollers 124 and 125. The first and second blades 126 and 127 are made to abut against the first and second collecting rollers 124 and 125 in the counter direction (the direction in which a free end portion faces the upstream side in the rotation direction) with respect to the rotation direction of the first and second collecting rollers 124 and 125. The length of each of the first and second blades 126 and 127 in the longitudinal direction is equal to the length of each of the first and second collecting rollers 124 and 125 in the rotational axis direction.

In this embodiment, a first cleaning voltage (first cleaning bias) of the negative polarity, which is the same polarity as the normal charge polarity of the toner, is applied to the first cleaning brush 122 positioned on the upstream side in the rotation direction of the intermediate transfer belt 6. In this embodiment, a negative DC voltage subjected to constant current control is applied to the first collecting roller 124 by a first cleaning power source (high-voltage power source) E3, which is a DC power source. As a result, the negative DC voltage subjected to constant current control is applied to the first cleaning brush 122 via the first collecting roller 124.

In this embodiment, the first cleaning voltage is applied such that a first cleaning current of −73 μA flows from the first cleaning power source E3 to the first cleaning brush 122 (that is, the first cleaning portion CL1) via the first collecting roller 124. In this embodiment, the first cleaning current is −73 μA, but is not limited thereto. That is, at the time of cleaning of the intermediate transfer belt 6, in the first cleaning portion CL1, a positive current flows in the outward direction.

On the other hand, in this embodiment, a second cleaning voltage (second cleaning bias) of the positive polarity, which is the opposite polarity of the normal charge polarity of the toner, is applied to the second cleaning brush 123 positioned on the downstream side in the rotation direction of the intermediate transfer belt 6. In this embodiment, a positive DC voltage subjected to constant current control is applied to the second collecting roller 125 by a second cleaning power source (high-voltage power source) E4, which is a DC power source. As a result, the positive DC voltage subjected to constant current control is applied to the second cleaning brush 123 via the second collecting roller 125. In this embodiment, the second cleaning voltage is applied such that a second cleaning current of +73 μA flows from the second cleaning power source E4 to the second cleaning brush 123 (that is, the second cleaning portion CL2) via the second collecting roller 125.

In this embodiment, the second cleaning current is +73 μA, but is not limited thereto. That is, in this embodiment, at the time of cleaning of the intermediate transfer belt 6, in the second cleaning portion CL2, a positive current flows in the inward direction.

By applying the cleaning voltages to the first and second cleaning brushes 122 and 123, cleaning electric fields suitable for collecting the toner on the intermediate transfer belt 6 are formed between the first cleaning brush 122 and the intermediate transfer belt 6 and between the second cleaning brush 123 and the intermediate transfer belt 6. As a result, the secondary transfer residual toner on the intermediate transfer belt 6 is electrostatically absorbed to the first and second cleaning brushes 122 and 123 and is removed from the intermediate transfer belt 6. From the secondary transfer residual toner on the intermediate transfer belt 6, the toner charged to the positive polarity, which is the opposite polarity of the normal charge polarity, adheres to the first cleaning brush 122. From the secondary transfer residual toner on the intermediate transfer belt 6, the toner charged to the negative polarity, which is the normal charge polarity, adheres to the second cleaning brush 123. The toner moves from the first and second cleaning brushes 122 and 123 to the first and second collecting rollers 124 and 125 by electric fields formed between the first collecting roller 124 and the first cleaning brush 122 and between the second collecting roller 125 and the second cleaning brush 123. Furthermore, the toner that has moved to the first and second collecting rollers 124 and 125 is scraped off from the first and second collecting rollers 124 and 125 by the first and second blades 126 and 127. The toner scraped off from the first and second collecting rollers 124 and 125 is accommodated in the housing 121. The toner accommodated in the housing 121 is conveyed by, for example, a conveying member (such as a screw) 128 provided in the housing 121 and is ejected from the housing 121. Furthermore, the toner is conveyed toward a collection container (not illustrated) provided in, for example, the apparatus main body of the image forming apparatus 100.

In this embodiment, the driving roller 22 is used as a common opposed roller for the first and second cleaning brushes 122 and 123, but opposed rollers may be independently provided for the first and second cleaning brushes 122 and 123.

In addition, in this embodiment, the voltages are applied to the first and second collecting rollers 124 and 125, but the method of supplying the cleaning current is not limited thereto. For example, rollers opposed to the first and second cleaning brushes 122 and 123 via the intermediate transfer belt 6 are independently provided. These rollers may be used as current supply members, and voltages may be applied thereto. In this case, the first and second cleaning brushes 122 and 123 may be used as opposed members and may be electrically grounded via the first and second collecting rollers 124 and 125. In this case, voltages having the opposite polarities of those of the voltages applied to the first and second collecting rollers 124 and 125 in this embodiment may be applied to the respective rollers opposed to the first and second cleaning brushes 122 and 123. Thus, the intermediate transfer belt 6 can be cleaned as in this embodiment. Furthermore, a configuration in which voltages are directly applied to the first and second cleaning brushes 122 and 123 (or electrically grounded in a direct manner) may also be employed.

In addition, in this embodiment, as the belt cleaning device 12, the electrostatic cleaning device is used, but the present disclosure is not limited to such a configuration. For example, a belt cleaning device of a type in which the toner on the intermediate transfer belt 6 is scraped off by a cleaning member such as a cleaning blade may be used.

4. Discharge Device

Figure 3:
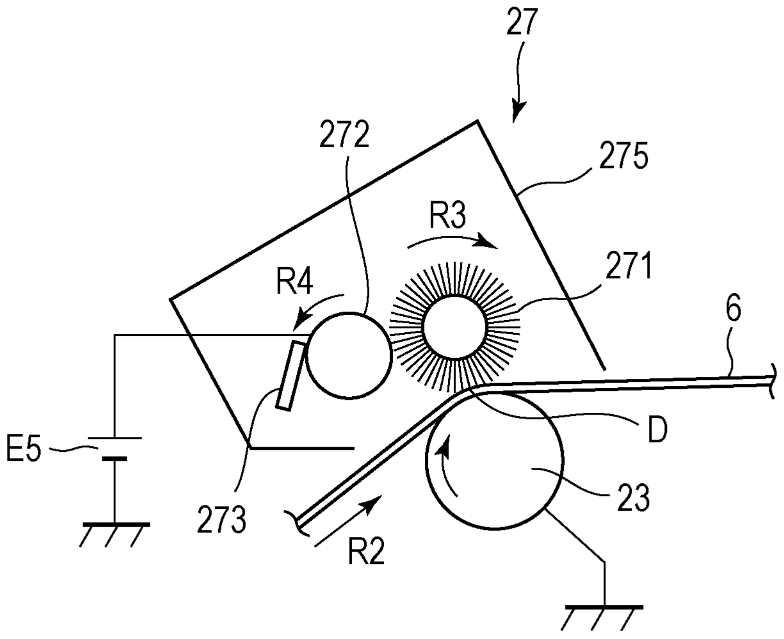
FIG. 3 is a schematic sectional view of a discharge device and a vicinity thereof.

FIG. 3 is a schematic enlarged sectional view of a discharge device 27 and a vicinity thereof in this embodiment. In this embodiment, the discharge device 27 as a discharger is disposed downstream of the secondary transfer portion N2 and upstream of the primary transfer portion N1 (the most upstream primary transfer portion N1Y) in the rotation direction of the intermediate transfer belt 6. In this embodiment, the discharge device 27 is disposed at a position opposed to the first auxiliary roller 23 via the intermediate transfer belt 6. That is, in this embodiment, the discharge device 27 is disposed downstream of the belt cleaning device 12 (the first and second cleaning portions CL1 and CL2) and upstream of the primary transfer portion N1 (the most upstream primary transfer portion N1Y) in the rotation direction of the intermediate transfer belt 6. In this embodiment, the discharge device 27 has substantially the same configuration as an electrostatic cleaning device, in particular, an electrostatic brush cleaning device using a conductive fur brush roller.

The discharge device (resistance increase suppressing device) 27 has a housing 275 disposed near the intermediate transfer belt 6. The following members are provided inside the housing 275. First, a discharge brush 271 as a discharge member (current supply member) is provided. In addition, a collecting roller 272 as a collecting member is provided. Furthermore, a blade 273 as a scraping member is provided.

The discharge brush 271 is constituted by a rotatable conductive fur brush roller. The brush fibers of the discharge brush 271 are made of carbon-dispersed nylon fibers, acrylic fibers, or polyester fibers having an electric resistance of $3\times10^5$ to $1\times10^{13}$ (Ω/cm) and a fiber thickness of 2 to 15 deniers. The discharge brush 271 is formed by flocking the brush fibers on a metal roller as a base material at a flocking ratio of 50000 to 500000 fibers/inch$^2$. The discharge brush 271 is disposed with a penetration amount of about 1.0 to 2.0 mm with respect to the intermediate transfer belt 6. In addition, the discharge brush 271 is rotatably driven by a driving motor (not illustrated) as a driver in the arrow R3 direction (clockwise direction) in the drawing at a circumferential speed of 20 to 80% of the circumferential speed of the intermediate transfer belt 6. That is, the discharge brush 271 rotates so as to move in the direction opposite to the moving direction of the intermediate transfer belt 6 at the portion abutting against the intermediate transfer belt 6, and rubs the surface of the intermediate transfer belt 6. In this embodiment, the discharge brush 271 is made to abut against the first auxiliary roller 23 functioning as an opposed member via the intermediate transfer belt 6. The first auxiliary roller 23 is electrically grounded. The discharge brush 271 is disposed such that the rotational axis direction thereof is substantially parallel to the width direction of the intermediate transfer belt 6. The length of the discharge brush 271 in the rotational axis direction is longer than the maximum image forming width on the intermediate transfer belt 6 in the width direction of the intermediate transfer belt 6. A portion where the discharge brush 271 and the intermediate transfer belt 6 abut against each other is a discharge portion (discharge position) D at which a current is supplied to the intermediate transfer belt 6 by the discharge brush 271 to balance the ions in the intermediate transfer belt 6. By supplying the discharge current to the intermediate transfer belt 6 in the discharge portion D, the intermediate transfer belt 6 is discharged to control the relationship between the current supplied to the intermediate transfer belt 6 in the inward direction and the current supplied to the intermediate transfer belt 6 in the outward direction. In this embodiment, the discharge portion D is positioned downstream of the belt cleaning device 12 (the first and second cleaning portions CL1 and CL2) and upstream of the primary transfer portion N1 (the most upstream primary transfer portion N1Y) in the rotation direction of the intermediate transfer belt 6. With the configuration in which the discharge portion D is disposed downstream of the first and second cleaning portions CL1 and CL2, it is possible to supply the discharge current to the intermediate transfer belt 6 in the cleaned state to efficiently discharge the intermediate transfer belt 6.

The collecting roller 272 is constituted by a rotatable roller (metal roller) made of metal (made of aluminum in this embodiment). The collecting roller 272 is disposed with a penetration amount of about 1.5 to 2.5 mm with respect to the discharge brush 271. In addition, the collecting roller 272 is rotatably driven by a driving motor (not illustrated) as a driver in the arrow R4 direction (counterclockwise direction) in the drawing at a circumferential speed equal to the circumferential speed of the discharge brush 271. That is, the collecting roller 272 rotates so as to move in the same direction as the moving direction of the discharge brush 271 at the portion abutting against the discharge brush 271. The collecting roller 272 is disposed such that the rotational axis direction thereof is substantially parallel to the width direction of the intermediate transfer belt 6. The length of the collecting roller 272 in the rotational axis direction is equal to the length of the discharge brush 271 in the rotational axis direction.

The blade 273 is disposed to abut against the collecting roller 272. The blade 273 is formed of a rubber material such as urethane rubber as an elastic member. The blade 273 is a plate-like member having a predetermined length in each of the longitudinal direction disposed substantially parallel to the rotational axis direction of the collecting roller 272 and the lateral direction substantially perpendicular to the longitudinal direction, and having a predetermined thickness. The blade 273 has a thickness of 1.6 to 2.2 mm and a hardness of 70 to 780 (23° C., 50% RH) in TRHD hardness. The blade 273 is disposed with a penetration amount of about 0.5 to 2.0 mm with respect to the collecting roller 272. The blade 273 is made to abut against the collecting roller 272 in the counter direction (the direction in which a free end portion faces the upstream side in the rotation direction) with respect to the rotation direction of the collecting roller 272. The length of the blade 273 in the longitudinal direction is equal to the length of the collecting roller 272 in the rotational axis direction.

In this embodiment, to the discharge brush 271, a discharge voltage (discharge bias) of the positive polarity, which is the opposite polarity of the normal charge polarity of the toner, is applied. In this embodiment, a positive DC voltage subjected to constant current control is applied to the collecting roller 272 by a discharge power source (high-voltage power source) E5, which is a DC power source. As a result, the positive DC voltage subjected to constant current control is applied to the discharge brush 271 via the collecting roller 272.

As a result, the discharge brush 271 (that is, the discharge portion D) is supplied with a discharge current for balancing the ions in the intermediate transfer belt 6. In this embodiment, at the time of the discharge for balancing the ions in the intermediate transfer belt 6, in the discharge portion D, the positive current is caused to flow in the inward direction. The discharge current will be described later in more detail.

In this embodiment, at least part of the negatively charged toner that has passed through the belt cleaning device 12 may be collected from the intermediate transfer belt 6 by the discharge device 27.

In this embodiment, the discharge device 27 has substantially the same configuration as an electrostatic cleaning device, and has a function of collecting at least part of the toner that has passed through the belt cleaning device 12. However, the discharge device 27 does not necessarily have the function of cleaning the intermediate transfer belt 6.

In addition, in this embodiment, the voltage is applied to the collecting roller 272, but the method of supplying the discharge current is not limited thereto. For example, a roller (corresponding to the first auxiliary roller 23 in this embodiment) opposed to the discharge brush 271 via the intermediate transfer belt 6 may be used as a current supply member, and the voltage may be applied thereto. In this case, the discharge brush 271 may be used as an opposed member and may be electrically grounded via the collecting roller 272. In this case, a voltage of the opposite polarity of the voltage applied to the collecting roller 272 in this embodiment may be applied to the roller (corresponding to the first auxiliary roller 23 in this embodiment) opposed to the discharge brush 271. Thus, discharge can be performed for balancing the ions in the intermediate transfer belt 6 as in this embodiment. Furthermore, a configuration in which a voltage is directly applied to the discharge brush 271 (or electrically grounded in a direct manner) may also be employed.

5. Discharge Current

Next, the setting of the discharge current supplied to the intermediate transfer belt 6 by the discharge device 27 will be described.

Figure 5:
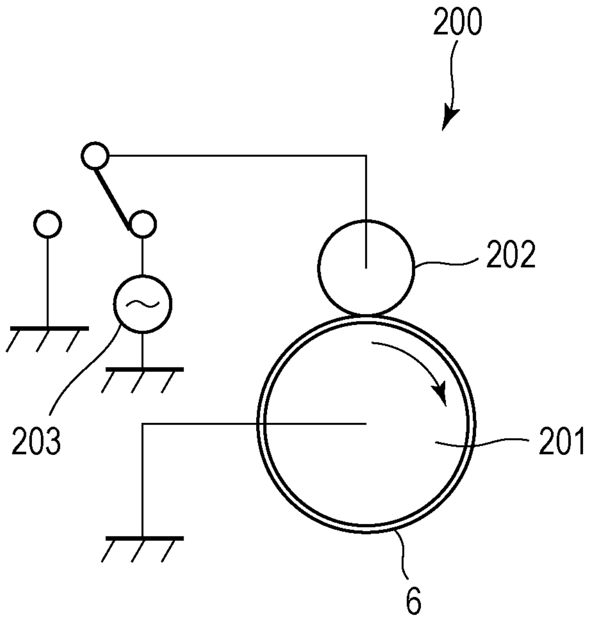
FIG. 5 is a schematic view of a measuring apparatus for measuring a relationship between a current balance and an electric resistance of the intermediate transfer belt.

Experiments conducted by the present inventors will be described. FIG. 5 is a schematic view illustrating a measuring apparatus 200 used in the experiments. As illustrated in FIG. 5, the intermediate transfer belt 6 cut into an appropriate size was wound around a metal roller 201 having an outer diameter of 30 mm, a current supply roller 202 was made to abut against the metal roller 201, and the metal roller 201 was rotated at 76 rpm. The intermediate transfer belt 6 was wound around the metal roller 201 such that the base layer 6*a* was in contact with the metal roller 201 and the current supply roller 202 abutted against the outer peripheral surface of the surface layer 6*c*. The metal roller 201 was electrically grounded, and a positive voltage and a negative voltage were alternately applied to the current supply roller 202 by a high-voltage power source 203. The current supply roller 202 has the same configuration as that of the primary transfer roller 5 in the image forming apparatus 100 of this embodiment.

Figure 6:
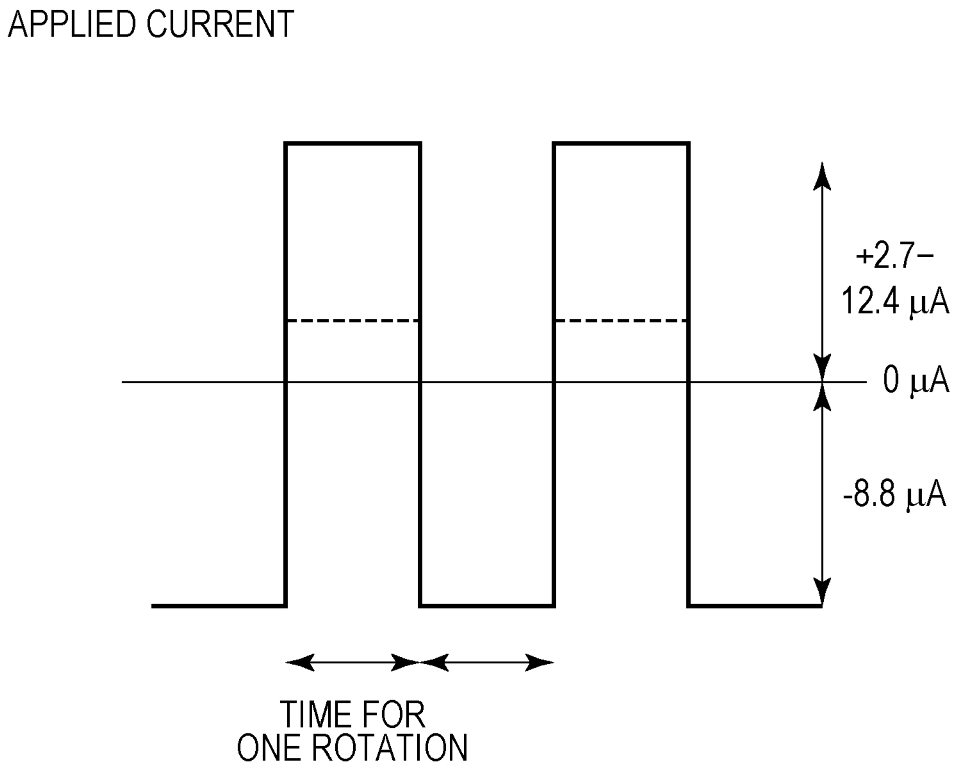
FIG. 6 is a graph illustrating an example of a waveform of a current supplied by the measuring apparatus of FIG. 5.

The voltage applied from the high-voltage power source 203 to the current supply roller 202 was a square wave voltage. FIG. 6 is a schematic diagram illustrating a waveform of a current supplied from the high-voltage power source 203 to the intermediate transfer belt 6 via the current supply roller 202. As illustrated in FIG. 6, a positive current and a negative current were caused to flow from the high-voltage power source 203 to the intermediate transfer belt 6 via the current supply roller 202 with a difference in magnitude between the two currents, and the volume resistivity of the intermediate transfer belt 6 after 330 minutes was measured. That is, the current flowed with the current balance fixed, and the volume resistivity at the time when the increase in volume resistivity was sufficiently saturated was measured. The volume resistivity was measured by using Hiresta UX manufactured by Nittoseiko Analytech Co., Ltd. and applying a voltage of 1000 V with a UR probe.

Figure 7:
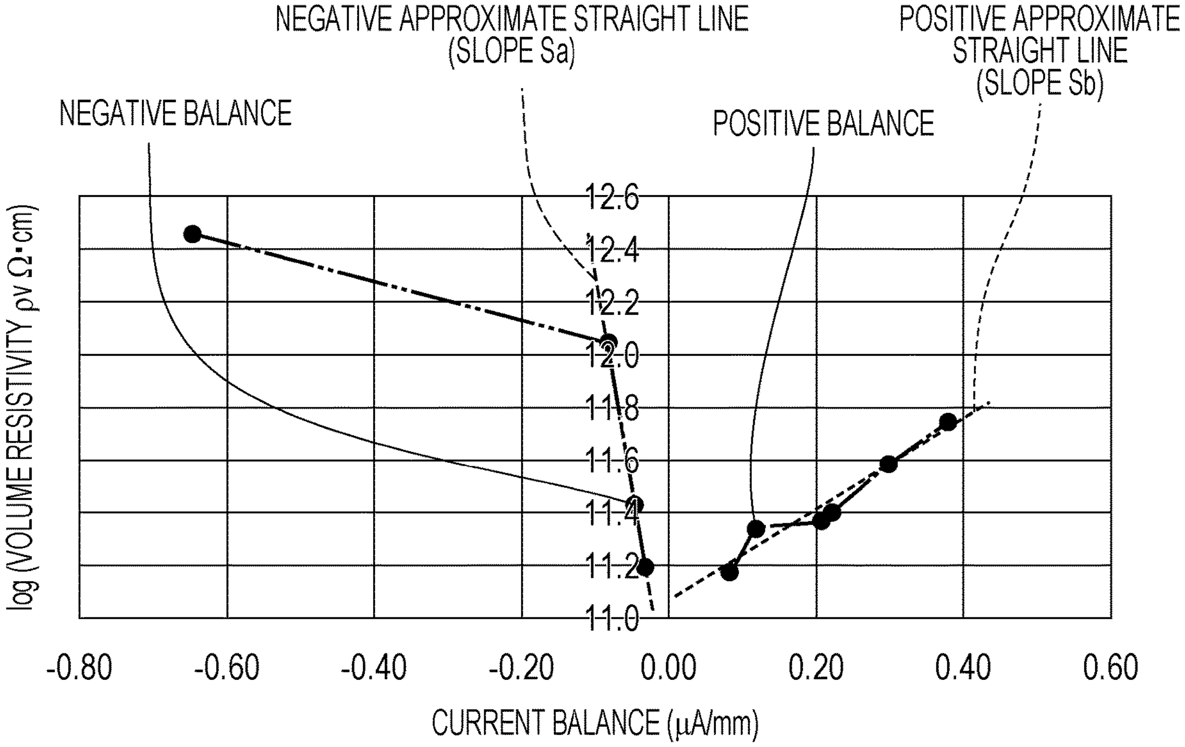
FIG. 7 is a graph illustrating an example of the relationship between the current balance and the electric resistance of the intermediate transfer belt.

FIG. 7 is a graph illustrating an example of the relationship (characteristics) between the current balance of the current supplied to the intermediate transfer belt 6 and the volume resistivity of the intermediate transfer belt 6 when the current is supplied to the intermediate transfer belt 6 by the measuring apparatus 200 as described above.

The horizontal axis of FIG. 7 indicates the value of the current balance obtained as follows. That is, the absolute value of the positive current flowing from the high-voltage power source 203 to the intermediate transfer belt 6 via the current supply roller 202 is represented by "Ia". The absolute value of the negative current flowing from the high-voltage power source 203 to the intermediate transfer belt 6 via the current supply roller 202 (that is, the absolute value of the positive current flowing from the metal roller 201 side to the high-voltage power source 203 side via the intermediate transfer belt 6) is represented by "Ib". At this time, in general, by subtracting "Ib", which is the positive current (absolute value) supplied in the direction (outward direction) from the inner peripheral surface side to the outer peripheral surface side of the intermediate transfer belt 6, from "Ia", which is the positive current (absolute value) supplied in the direction (inward direction) from the outer peripheral surface side to the inner peripheral surface side of the intermediate transfer belt 6, the current balance can be obtained. However, in this embodiment, to obtain the current balance per unit length of the intermediate transfer belt 6 in the width direction in a region where the current is supplied by the current supply roller 202, the value of "Ia−Ib" is divided by the length of the current supplied region in the width direction of the intermediate transfer belt 6. Here, the length of the region where the current is supplied by the current supply member in the width direction of the intermediate transfer belt 6 is the length of the shorter one of the current supply member and the opposed member opposed to the current supply member via the intermediate transfer belt 6 in the width direction. In the case of the measuring apparatus 200 illustrated in FIG. 5, the length of the region where the current is supplied by the current supply roller 202 in the width direction of the intermediate transfer belt 6 is the length of the current supply roller 202 in the longitudinal direction (rotation axis direction). For simplicity, the length of the region where the current is supplied by the current supply member in the width direction of the intermediate transfer belt 6 is also simply referred to as "the length of the current supply member in the longitudinal direction" or "the longitudinal length of the current supply member". By using the current balance per unit length of the current supplied region, the current balance can be more accurately evaluated regardless of the length of the current supplied region. The horizontal axis of FIG. 7 indicates the value of the current balance obtained in the above manner. The same result can be obtained by subtracting a value obtained by dividing "Ib" by the longitudinal length of the current supply roller 202 from a value obtained by dividing "Ia" by the longitudinal length of the current supply roller 202. Hereinafter, unless otherwise stated, the current balance refers to the current balance per unit length of the current supplied region as described above. That is, the current balance is a value obtained by subtracting "the sum of positive currents (absolute values) per unit length of the current supply member in the longitudinal direction, supplied by the current supply member in the direction (outward direction) from the inner peripheral surface side to the outer peripheral surface side of the intermediate transfer belt 6", from "the sum of positive currents (absolute values) per unit length of the current supply member in the longitudinal direction, supplied by the current supply member in the direction (inward direction) from the outer peripheral surface side to the inner peripheral surface side of the intermediate transfer belt 6". The current balance on the horizontal axis of FIG. 7 is positively plotted when "Ia" is larger than "Ib" (when "Ia−Ib" is a positive value), and is negatively plotted when "Ia" is smaller than "Ib" (when "Ia−Ib" is a negative value). On the other hand, the vertical axis of FIG. 7 is a common logarithm (log (volume resistivity)) of the value of the volume resistivity of the intermediate transfer belt 6.

In FIG. 7, the degree of increase in the volume resistivity due to the increase in the absolute value of the current balance is compared between the case where the current balance is on the positive side and the case where the current balance is on the negative side. In the configuration of this embodiment, the increase in the volume resistivity in the case where the current balance is on the positive side is gradual, and the increase in the volume resistivity in the case where the current balance is on the negative side is rapid. When the current balance is on the negative side, the volumetric resistivity rapidly increases due to an increase in the absolute value of the current balance to be greater than or equal to $1\times10^{12}$ Ω·cm, and then is substantially saturated. In the configuration of this embodiment, as will be described later, for example, from the viewpoint of the image quality (suppressing a mesh-like abnormal image and maintaining sufficient transferability), an allowable upper limit value of the volume resistivity of the intermediate transfer belt 6 is about $1\times10^{12}$ Ω·cm. On the other hand, when the current balance is on the positive side, the volumetric resistivity gradually increases due to an increase in the absolute value of the current balance, and often does not reach $1\times10^{12}$ Ω·cm, which is the upper limit. In FIG. 7, the slope of the approximate straight line of the relationship between the current balance and the volume resistivity when the current balance is on the positive side is represented by "Sa", and the slope of the approximate straight line of the relationship between the current balance and the volume resistivity when the current balance is on the negative side is represented by "Sb". The slope Sa is a slope in a range where the current balance is a positive value near zero (range where the volume resistivity is less than the upper limit value). That is, the slope Sa is a slope in a range where the volume resistivity of the intermediate transfer belt 6 is less than or equal to a predetermined value and the value of the current balance is a positive value. The slope Sb is a slope in a range where the current balance is a negative value near zero (range where the volume resistivity is less than the upper limit value). That is, the slope Sb is a slope in a range where the volume resistivity of the intermediate transfer belt 6 is less than or equal to a predetermined value and the value of the current balance is a negative value. At this time, in the example illustrated in FIG. 7, the absolute value |Sb| of the slope Sb is about seven times as large as the absolute value |Sa| of the slope Sa.

Although the mechanism of this phenomenon has not been completely elucidated yet, the following is expected. The ion-conductive material includes an ion-conductive material in which negative ions easily move and an ion-conductive material in which positive ions easily move. In the configuration of this embodiment, it is considered that the negative ions easily move in the ion-conductive material. From a cross-sectional photograph of the elastic layer 6*b* of the intermediate transfer belt 6, the following is found. That is, the negative ions of the ion-conductive material are uniformly dispersed at the initial stage of use of the intermediate transfer belt 6, but when the electrical resistance increases, the negative ions of the ion-conductive material are unevenly distributed on the base layer 6*a* side or the surface layer 6*c* side of the elastic layer 6*b*. The base layer 6*a* side of the elastic layer 6*b* is the inner peripheral surface side of the intermediate transfer belt 6, which is the metal roller 201 (or stretching roller) side, and the elongation of the elastic layer 6*b* is extremely small. Therefore, it is considered that a negative current flows in the direction (inward direction) from the outer peripheral surface side to the inner peripheral surface side of the intermediate transfer belt 6, and the negative ions of the ion-conductive material gathered on the base layer 6*a* side remain substantially at the same place. As a result, it is considered that when the current balance is on the negative side, the degree of increase in the volume resistivity (the absolute value of the slope Sb) due to the increase in the absolute value of the current balance becomes large. On the other hand, since the surface layer 6*c* side of the elastic layer 6*b* is the outer peripheral surface side of the intermediate transfer belt 6, it is likely to elongate. Therefore, it is considered that a positive current flows in the direction (inward direction) from the outer peripheral surface side to the inner peripheral surface side of the intermediate transfer belt 6, and, even if the negative ions of the ion-conductive material are unevenly distributed on the surface layer 6*c* side, the elastic layer 6*b* elongates, so that the unevenly distributed state is relieved. As a result, it is considered that when the current balance is on the positive side, the degree of increase in the volume resistivity (the absolute value of the slope Sa) due to the increase in the absolute value of the current balance becomes small.

As described above, in a case where |Sb|>Sa|, when the current balance becomes negative, the electric resistance of the intermediate transfer belt 6 abruptly increases. In particular, in a case where |Sb| exceeds twice |Sa|, the electric resistance of the intermediate transfer belt 6 abruptly increases. Therefore, it is understood that the discharge current may be set so as to offset the current balance to the positive side so that the current balance does not become negative even due to a factor such as the fluctuation of the output of the discharge power source E5.

Next, the calculation of the discharge current supplied to the discharge brush 271 as the discharge member will be described.

In this embodiment, the current is supplied to the intermediate transfer belt 6 at the primary transfer portion N1, the secondary transfer portion N2, the first and second cleaning portions CL1 and CL2 by the primary transfer roller 5, the secondary transfer roller 9, and the first and second cleaning brushes 122 and 123, respectively. Therefore, in this embodiment, the discharge current supplied to the discharge brush 271 at an image forming time (during image formation) is obtained by the following formula (1). That is, the current density is obtained by dividing each of the absolute values of the currents supplied to the intermediate transfer belt 6 by the primary transfer roller 5, the secondary transfer roller 9, and the first and second cleaning brushes 122 and 123 at the image forming time (during image formation) by the longitudinal length of each member. In addition, by subtracting the sum of current densities of positive currents supplied in the direction (inward direction) from the outer peripheral surface side to the inner peripheral surface side of the intermediate transfer belt 6 from the sum of current densities of positive currents supplied in the direction (outward direction) from the inner peripheral surface side to the outer peripheral surface side of the intermediate transfer belt 6, the difference between the above current densities is obtained. Then, the value is multiplied by the longitudinal length of the discharge brush 271. Furthermore, a discharge correction current for offsetting the current balance as described above is added. In this embodiment, the discharge current having the value obtained by the following formula (1) in the above manner is supplied to the discharge brush 271 at the image forming time (during image formation).

$$Idis=\{(It1y+It1m+It1c+It1k)/Rt1-It2/Rt2+Icl1/Rcl1-Icl2/Rcl2\}\times Rdis+Idis\_offset \quad (1)$$

Rt1: longitudinal length of primary transfer roller
Rt2: longitudinal length of secondary transfer roller
Rcl1: longitudinal length of first cleaning brush
Rcl2: longitudinal length of second cleaning brush
Rdis: longitudinal length of discharge brush
It1y, It1m, It1c, It1k: primary transfer current
It2: secondary transfer current
Icl1: first cleaning current
Icl2: second cleaning current
Idis: discharge current
Idis_offset: discharge correction current In this embodiment, the length of a region where the current is supplied by the primary transfer roller 5 in the width direction of the intermediate transfer belt 6 is the length of the primary transfer roller 5 in the longitudinal direction, which is the shorter one of the lengths of the primary transfer roller 5 and the photosensitive drum 1 in the direction. The length of a region where the current is supplied by the secondary transfer roller 9 in the width direction of the intermediate transfer belt 6 is the length of the secondary transfer roller 9 in the longitudinal direction, which is the shorter one of the lengths of the secondary transfer roller 9 and the secondary transfer opposed roller 21 in the direction. The length of a region where the current is supplied by the first cleaning brush 122 in the width direction of the intermediate transfer belt 6 is the length of the first cleaning brush 122 in the longitudinal direction, which is the shorter one of the lengths of the first cleaning brush 122 and the driving roller 22 in the direction. The length of a region where the current is supplied by the second cleaning brush 123 in the width direction of the intermediate transfer belt 6 is the length of the second cleaning brush 123 in the longitudinal direction, which is the shorter one of the lengths of the second cleaning brush 123 and the driving roller 22 in the direction. The length of a region where the current is supplied by the discharge brush 271 in the width direction of the intermediate transfer belt 6 is the length of the discharge brush 271 in the longitudinal direction, which is the shorter one of the lengths of the discharge brush 271 and the first auxiliary roller 23 in the direction.

The image forming time (during image formation) regarding the currents supplied to the above-described respective portions (the primary transfer portion N1, the secondary transfer portion N2, the first and second cleaning portions CL1 and CL2, and the discharge portion D) can be represented by a period in which an image forming region (described later) on the intermediate transfer belt 6 is passing through the respective portions. That is, the primary transfer current at the image forming time can be represented by the primary transfer current when the image forming region on the intermediate transfer belt 6 during the primary transfer of the image is passing through the primary transfer portion N1. In addition, the secondary transfer current at the image forming time can be represented by the secondary transfer current when the recording material P during the secondary transfer of the image is passing through the secondary transfer portion N2. Furthermore, the first and second cleaning currents at the image forming time can be represented by the first and second cleaning currents when the image forming region on the intermediate transfer belt 6 immediately after the image is transferred onto the recording material P at the secondary transfer portion N2 is passing through the first and second cleaning portions CL1 and CL2. Furthermore, the discharge current at the image forming time can be represented by the discharge current when the image forming region on the intermediate transfer belt 6 immediately after the image is transferred onto the recording material P at the secondary transfer portion N2 is passing through the discharge portion D. However, a predetermined period in a print job (described later) (for example, a period from the start of feeding of one sheet of the recording material P to the end of ejection) may be set as a period for one image-formed sheet, and, for example, an average value for each period may be set as the current supplied at each portion at the image forming time. From the viewpoint of setting a discharge current that can sufficiently suppress an increase in the electric resistance of the intermediate transfer belt 6, it is only necessary to estimate the substantial current balance of the current supplied to the intermediate transfer belt 6 with sufficient accuracy.

Table 1 illustrates examples of initial values of the respective currents at the time of power-on of the image forming apparatus 100 in this embodiment. However, the values of the currents are not limited to these values. In this embodiment, the discharge correction current is set to 11 μA for the following reasons. That is, in the configuration of this embodiment, there is a possibility that the output of the discharge power source E5 fluctuates within the range of the +5% due to the individual difference of the discharge power source E5. Therefore, the discharge current is set to about 220 μA, and the discharge correction current is set to 11 μA, which is 5% of the discharge current. The above-mentioned current value, which is about 220 μA, is an approximate value of the discharge current on the assumption that the right side of the above-mentioned formula (1) becomes relatively large. Note that the fact that the output of the power source fluctuates due to the individual difference of the power source means that even if 220 μA is set as a target value, 209 μA may be output or 231 μA may be output due to the accuracy of the power source. In other words, although there is no time variation in each device, the current that actually flows with respect to the target value varies for each device due to the individual variation between devices. As described above, in this embodiment, the discharge current is set to be offset such that the current balance is on the positive side near zero. This offset amount is greater than or equal to the fluctuation of the discharge current due to the fluctuation of the output of the discharge power source E5.

TABLE 1

| | Current value | | Longitudinal length | |
|---|---|---|---|---|
| | Symbol | [μA] | Symbol | [mm] |
| Primary transfer target current (Y) | It1y | 74 | Rt1 | 331.6 |
| Primary transfer target current (M) | It1m | 74 | Rt1 | 331.6 |
| Primary transfer target current (C) | It1c | 74 | Rt1 | 331.6 |
| Primary transfer target current (K) | It1k | 74 | Rt1 | 331.6 |

TABLE 1-continued

| | Current value | | Longitudinal length | |
|---|---|---|---|---|
| | Symbol | [μA] | Symbol | [mm] |
| Second transfer target current | It2 | 95 | Rt2 | 338 |
| First cleaning target current | Icl1 | 73 | Rcl1 | 340 |
| Second cleaning target current | Icl2 | 73 | Rcl2 | 340 |
| Discharge correction current | Idis_offset | 11 | Rdis | 340 |

When the values illustrated in Table 1 are applied to the formula (1), the discharge current is 212.8 μA. The current balance at this time is, as described above, a value obtained by subtracting "the sum of positive currents (absolute values) per unit length of the current supply member in the longitudinal direction, supplied by the current supply member in the direction (outward direction) from the inner peripheral surface side to the outer peripheral surface side of the intermediate transfer belt 6", from "the sum of positive currents (absolute values) per unit length of the current supply member in the longitudinal direction, supplied by the current supply member in the direction (inward direction) from the outer peripheral surface side to the inner peripheral surface side of the intermediate transfer belt 6". When this is calculated, +0.03 microampere per millimeter (μA/mm) is obtained, so that the current balance is +0.03 μA/mm. That is, by adding the discharge correction current, the current balance is in a positive range near zero and does not become negative even if the discharge current fluctuates.

Here, if the intermediate transfer belt 6 has the characteristic of |Sb|>Sa| as in this embodiment, the discharge current may be +2.5% or more of the target current value of the discharge current with which the current balance is 0 μA/mm (for example, +5 μA or more if the target current value is 200 μA, that is, 205 μA or more). As a result, the current balance can be more accurately set to a positive range near zero, and the current balance can be prevented from becoming negative even if the discharge current fluctuates. On the other hand, in a system where |Sb|>Sa| as in this embodiment, the discharge current is +50% or less of the target current value of the discharge current with which the current balance is 0 μA/mm (for example, +100 μA or less if the target current value is 200 μA, that is, 300 μA or less), or may be +30% or less, or +10% or less. If the discharge current is too large in this case, the effect of suppressing the increase in the electric resistance of the intermediate transfer belt 6 may be insufficient. As will be described in a second embodiment, depending on the characteristics of the intermediate transfer belt 6, a case where |Sa|>Sb| is also possible. If the intermediate transfer belt 6 has such a characteristic, the discharge current may be −2.5% or less of the target current value of the discharge current with which the current balance is 0 μA/mm (for example, −5 μA or less if the target current value is 200 μA, that is, 195 μA or less). As a result, the current balance can be more accurately set to a negative range near zero, and the current balance can be prevented from becoming positive even when the discharge current fluctuates. On the other hand, in a system where |Sa|>Sb| as will be described in the second embodiment, the discharge current is −50% or more of the target current value of the discharge current with which the current balance is 0 μA/mm (for example, −100 μA or more if the target current value is 200 μA, that is, 100 μA or more), or may be −30% or more, or −10% or more. If the discharge current is too small in this case, the effect of suppressing the increase in the electric resistance of the intermediate transfer belt 6 may be insufficient.

In this embodiment, when a print job is started, the values of the primary transfer current and the secondary transfer current are substantially always detected. Then, in this embodiment, on the basis of the detected current values, the discharge current is calculated at a predetermined timing, which is, for example, every predetermined number of image-formed sheets (for example, 1 to 20 sheets), and the discharge current is changed to a newly calculated value.

By calculating the discharge current using the detection results of the primary transfer current and the secondary transfer current, even if the primary transfer current and the secondary transfer current deviate from the values at the time of power-on of the image forming apparatus 100, the discharge current can be changed to the optimal discharge current at that time. During execution of a print job, the primary transfer current and the secondary transfer current may unintentionally change due to the presence or absence of toner, change in the electric resistance of the intermediate transfer belt 6 or the recording material P, or the like. Furthermore, during execution of a print job, the primary transfer current and the secondary transfer current may unintentionally change due to readjustment of the primary transfer voltage and the secondary transfer voltage. Before the detection results of the primary transfer current and the secondary transfer current in the print job become available (for example, before the image formation is performed for the initial predetermined number of image-formed sheets), the following operation can be performed. For example, the discharge current can be calculated using the target values (table values) of the primary transfer current and the secondary transfer current, or the discharge current in a print job before this time (for example, the last-time print job) can be used.

In this embodiment, as the first and second cleaning currents, the target values of the first and second cleaning currents subjected to constant current control are used to calculate the discharge current. In this embodiment, as described later, each of the first and second cleaning power sources E3 and E4 performs constant current control such that the current detected by a current detecting unit is substantially constant at the target value. Therefore, the discharge current may be calculated using the detection results of the first and second cleaning currents (which may be, for example, average values for the number of image-formed sheets).

6. Control Mode

Figure 8:
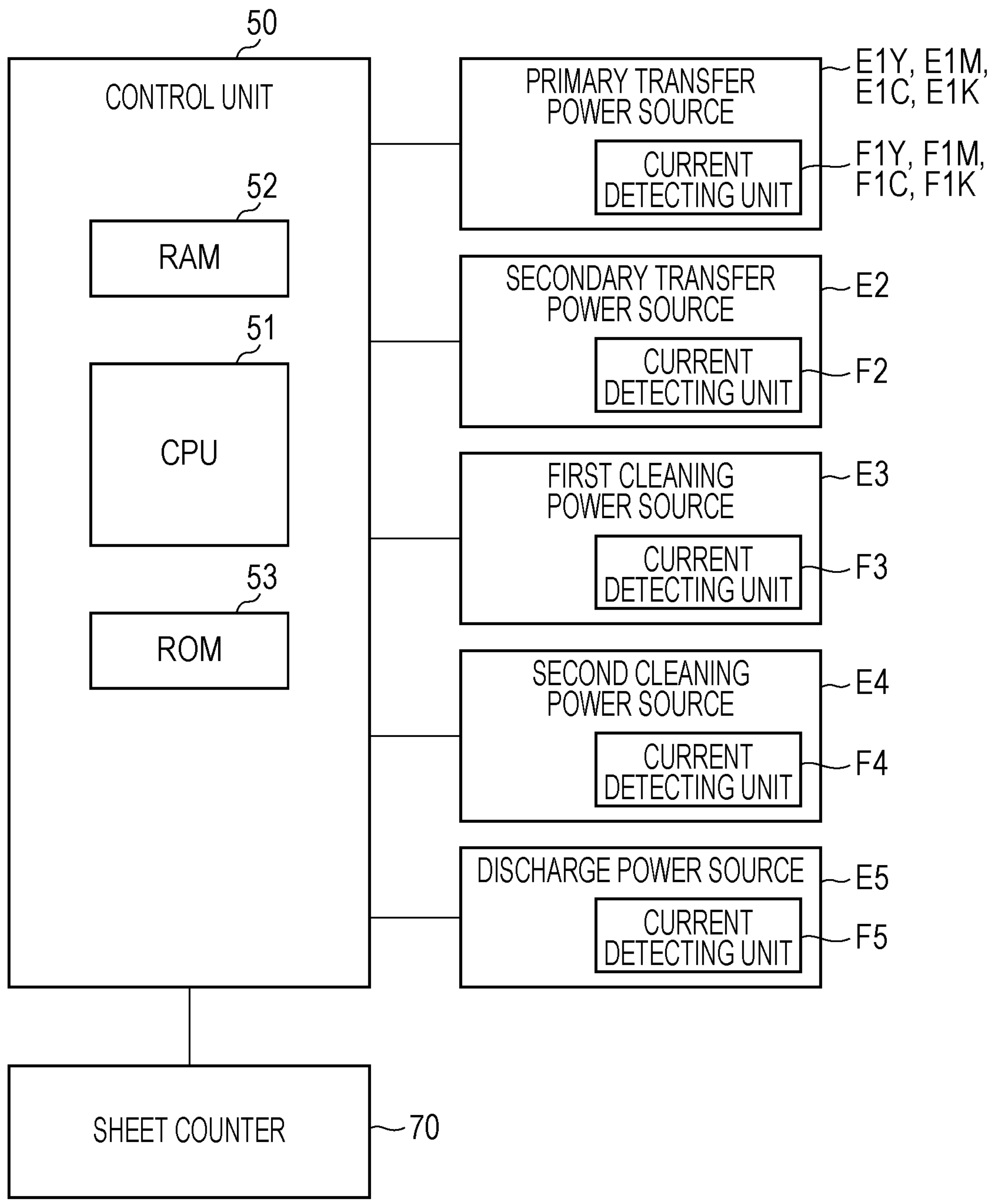
FIG. 8 is a schematic block diagram illustrating a control mode of the image forming apparatus.

FIG. 8 is a schematic block diagram illustrating a control mode of a main portion of the image forming apparatus 100 of this embodiment. The image forming apparatus 100 includes a control unit 50 as a controller. The control unit 50 includes a central processing unit (CPU) 51 as an arithmetic controller, which is a central element for performing arithmetic processing, memories (storage media) such as a random-access memory (RAM) 52 and a read-only memory (ROM) 53 as a storage, and the like. The RAM 52, which is a rewritable memory, stores information input to the control unit 50, detected information, calculation results, and the like, and the ROM 53 stores a control program, a data table obtained in advance, and the like. The CPU 51 and the memories such as the RAM 52 and the ROM 53 can transfer and read data to each other.

An operation portion (not illustrated) provided in the image forming apparatus 100 is connected to the control unit 50. In addition, an external device (not illustrated) such as an image reading portion (image scanner) or a personal computer is connected to the control unit 50.

The control unit 50 integrally controls each portion of the image forming apparatus 100 on the basis of an instruction from the operation portion of the image forming apparatus 100, image data from the image reading portion, or an image forming signal (image data, control command) from an external device, and executes a print job (described later). In this embodiment, for example, the primary transfer power source E1, the secondary transfer power source E2, the first cleaning power source E3, the second cleaning power source E4, and the discharge power source E5 are connected to the control unit 50. In addition, in this embodiment, as a counter constituted by including a storage for counting the number of sheets of the recording material P on which an image is formed and which is output from the image forming apparatus 100, a sheet counter 70 is connected to the control unit 50. In this embodiment, the primary transfer power source E1 is independently provided for each image forming portion 10.

Here, the image forming apparatus 100 executes a print job, which is a series of operations for forming an image on a single piece or a plurality of pieces of the recording material P and outputting the single piece or plurality of pieces of the recording material P, and the print job is started by a start instruction. In this embodiment, the start instruction is input to the image forming apparatus 100 from the operation portion or external device. The print job generally includes an image forming step, a pre-rotation step, a sheet-interval step in a case where an image is formed on a plurality of pieces of the recording material P, and a post-rotation step. The image forming step is a period in which formation of an electrostatic image of the image that is to be actually formed on the recording material P to be output, formation of a toner image, and primary transfer and secondary transfer of the toner image are performed. This period is referred to as the image forming time. More specifically, the timing of the image forming time varies depending on the position for performing each of the electrostatic image formation, the toner image formation, and the primary transfer and the secondary transfer of the toner image, and corresponds to a period in which the image forming region on the photosensitive drum 1 or the intermediate transfer belt 6 is passing through each position. The pre-rotation step is a period in which a preparation operation before the image forming step is performed from when the start instruction is input to the image forming apparatus 100 to when the image is actually started to be formed. The sheet-interval step (recording material-interval step, image-interval step) is a period corresponding to an interval between pieces of the recording material P when the image formation on the plurality of pieces of the recording material P is continuously performed (continuous image formation). The post-rotation step is a period in which an arrangement operation (preparation operation) after the image forming step is performed. The period other than the image forming time is a non-image forming time, and includes the pre-rotation step, the sheet-interval step, the post-rotation step, and further a pre-multi-rotation step, which is a preparation operation at the time of power-on of the image forming apparatus 100 or at the time of return from the sleep state. More specifically, the timing of the non-image forming time corresponds to a period in which a non-image forming region on the photosensitive drum 1 or the intermediate transfer belt 6 is passing through each position for performing each of the electrostatic image formation, the toner image formation, and the primary transfer and the secondary transfer of the toner image. Note that the image forming region on the photosensitive drum 1 or the intermediate transfer belt 6 is a region where the image transferred to the recording material P to be output from the image forming apparatus 100 can be formed, and the non-image forming region is a region other than the image forming region.

In addition, in this embodiment, the primary transfer power source E1 and the secondary transfer power source E2 respectively include current detecting units (one or more current detecting circuits) F1 and F2 as current detectors. The control unit 50 executes control (active transfer voltage control (ATVC)) for obtaining a voltage value at which the current values detected by the current detecting units F1 and F2 become predetermined target current values at the non-image forming time such as the pre-rotation step. Then, the primary transfer power source E1 and the secondary transfer power source E2 perform constant voltage control on the output values such that the current values become substantially constant at the above voltage value (or a voltage value determined on the basis of the above voltage value) at the image forming time (at the time of the primary transfer and at the time of the secondary transfer). In this embodiment, control is performed for independently determining the primary transfer voltage at each of the image forming portions 10Y, 10M, 10C, and 10K. In addition, in this embodiment, the first and second cleaning power sources E3 and E4 respectively include current detecting units (one or more current detecting circuits) F3 and F4 as current detectors. The first and second cleaning power sources E3 and E4 perform constant current control on the output values such that the current values detected by the current detecting units F3 and F4 become substantially constant at predetermined target current values at the image forming time (at the time of cleaning). The target current value related to each of the primary transfer voltage, the secondary transfer voltage, and the first and second cleaning voltages may be changed, for example, according to an image forming condition such as a detection result of the environment (at least one of the temperature and the humidity of at least one of the inside and the outside of the image forming apparatus 100). For example, according to the image forming condition, a corresponding value may be selected from a plurality of values (table values) set in advance. Furthermore, in order to readjust the primary transfer voltage and the secondary transfer voltage during execution of the print job, for example, control may be performed for determining the primary transfer voltage and the secondary transfer voltage in the sheet-interval step for each predetermined number of image-formed sheets. In this embodiment, the target values of the first and second cleaning currents are fixed to substantially constant values during execution of the print job. Furthermore, in this embodiment, the discharge power source E5 includes a current detecting unit (current detecting circuit) F5 as a current detector. When discharging the intermediate transfer belt 6, the discharge power source E5 performs constant current control on the output value such that the current value detected by the current detecting unit F5 becomes substantially constant at a target value of the discharge current obtained as described above. Note that each of the primary transfer power source E1, the secondary transfer power source E2, the first and second cleaning power sources E3 and E4, and the discharge power source E5 may further include a voltage detecting unit that detects an output voltage.

7. Control Procedure

Figure 9:
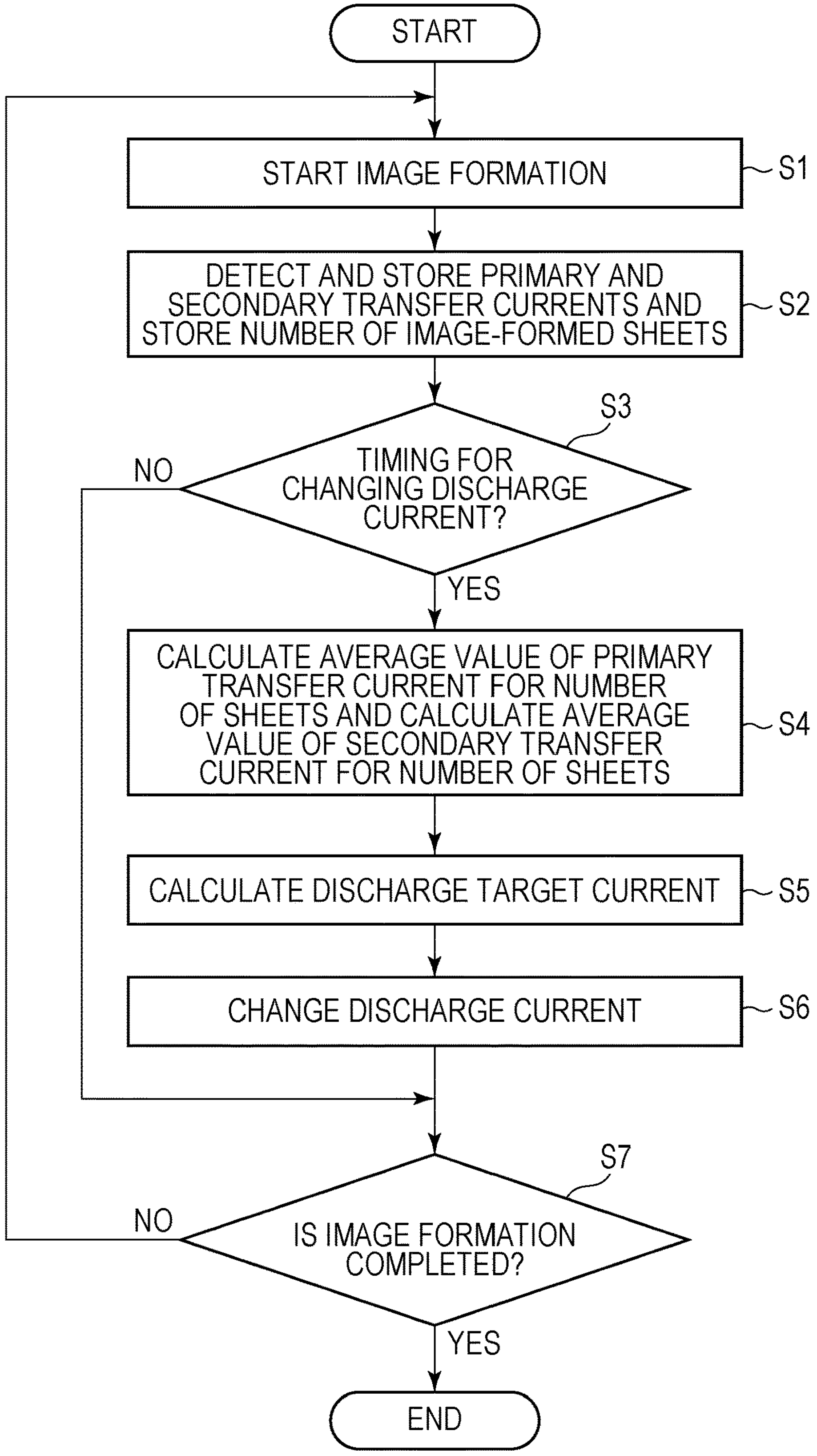
FIG. 9 is a flowchart illustrating an outline of a procedure of a print job.

Next, an operation of a print job in this embodiment will be described. FIG. 9 is a flowchart illustrating an outline of a procedure of a print job in this embodiment.

When a print job is started and image formation is started (S1), the control unit 50 stores, in the RAM 52, detection results of the primary transfer current and the secondary transfer current at the image forming time, and also integrates the number of image-formed sheets and stores the integrated number in the sheet counter 70 (S2). In this embodiment, as the primary transfer current at the image forming time, the control unit 50 stores, in the RAM 52, a detection result of the primary transfer current (average value for each sheet in this embodiment) at the time of the primary transfer for each image transferred onto one sheet of the recording material P (when the image forming region is passing through the primary transfer portion N1). In addition, in this embodiment, as the secondary transfer current at the image forming time, the control unit 50 stores, in the RAM 52, a detection result of the secondary transfer current (average value for each sheet in this embodiment) at the time of the secondary transfer for each image transferred onto one sheet of the recording material P (when the recording material P is passing through the secondary transfer portion N2). Furthermore, every time an image is formed on one sheet of the recording material P (for example, secondarily transferred), the control unit 50 integrates the number of image-formed sheets and stores the integrated number in the sheet counter 70.

Subsequently, the control unit 50 determines whether it is a timing for changing the discharge current (S3). In this embodiment, the control unit 50 determines whether the number of image-formed sheets reaches a predetermined number of image-formed sheets (14 sheets in this embodiment), and if the number of image-formed sheets reaches the predetermined number, the control unit 50 determines that it is the timing for changing the discharge current. If the control unit 50 determines in S3 that it is the timing for changing the discharge current ("Yes"), the control unit 50 averages the primary transfer current and the secondary transfer current for the number of image-formed sheets stored in the RAM 52 (S4). Subsequently, the control unit 50 calculates the target value (target current) of the discharge current by the above-described calculation method (S5). As described above, the control unit 50 calculates the discharge current by the above-described formula (1) using the detection result (average value) of the primary transfer current, the detection result (average value) of the secondary transfer current, and the target values (which may be detection results) of the first and second cleaning currents. Subsequently, the control unit 50 changes the discharge current to the value calculated this time (S6). That is, during the job of continuous image formation, the control unit 50 controls the discharge power source such that the average value of the current balance when the image formation is continuously performed on a predetermined number of sheets of the recording material P becomes a positive value. If the discharge current is changed in S6, the control unit 50 deletes the detection results of the primary transfer current and the secondary transfer current stored in the RAM 52 and also resets the count value of the number of image-formed sheets regarding the timing for changing the discharge current stored in the sheet counter 70 to an initial value (zero in this embodiment). If the control unit 50 determines in S3 that it is not the timing for changing the discharge current ("No"), the process proceeds to S7.

Subsequently, the control unit 50 determines whether all image formation of the print job is completed (S7). If it is determined that the image formation is not completed ("No"), the process returns to S1, and if it is determined that the image formation is completed ("Yes"), the print job is ended.

Figure 10:
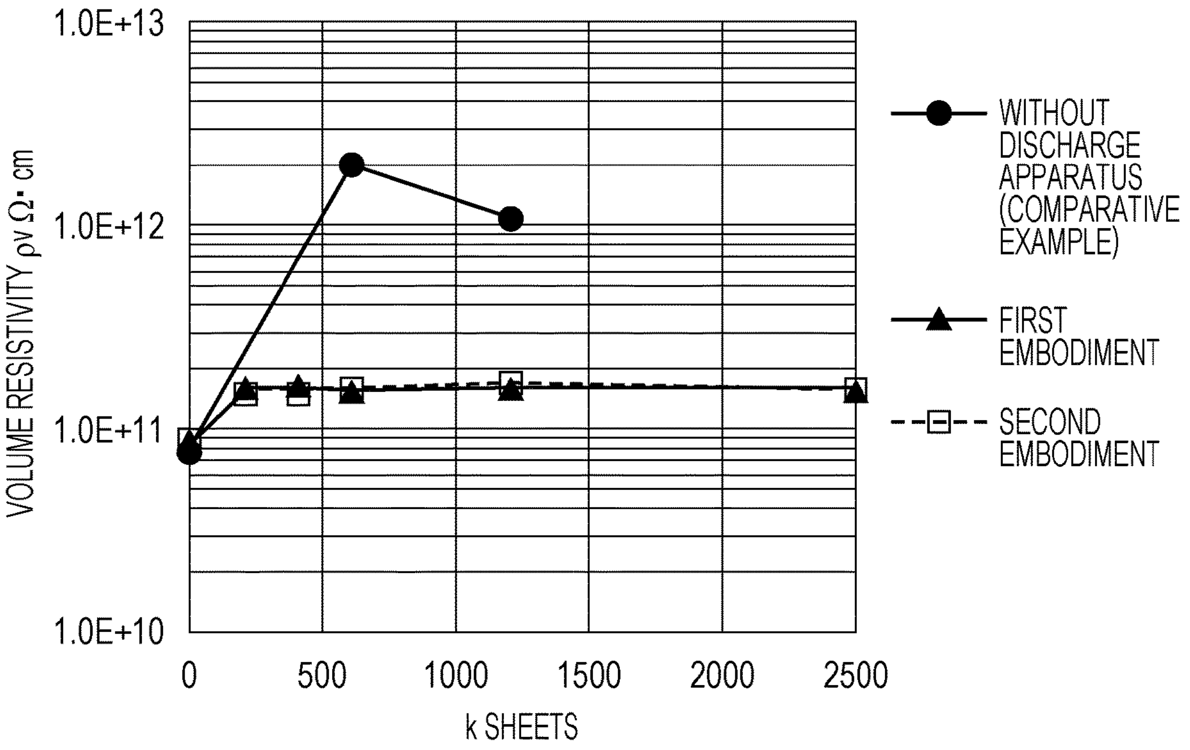
FIG. 10 is a graph illustrating an effect of an embodiment.

A sheet-passing test (continuous image formation durability test) was conducted on the image forming apparatus 100 of this embodiment to examine a transition in the electric resistance of the intermediate transfer belt 6. In this embodiment, the current balance was set to +0.03 μA/mm by using the discharge device 27. Substantially the same sheet-passing test was also conducted on the image forming apparatus 100 of a comparative example in which the discharge device 27 was not provided. The test conditions are as follows. The environmental temperature-humidity was 23° C./50%, the rotational speed (circumferential speed) of the intermediate transfer belt 6 was 464 mm/s, and the recording material P was continuously passing plain paper having a basis weight of 81 g/m$^2$. The configuration and operation of the image forming apparatus 100 of the comparative example are substantially the same as the configuration and operation of the image forming apparatus 100 of this embodiment except that the discharge device 27 is not provided. In the image forming apparatus 100 of the comparative example, elements having the same or corresponding functions or configurations as those of the image forming apparatus 100 of this embodiment are also represented by the same reference numerals in the description. The results are illustrated in FIG. 10. For convenience, FIG. 10 also illustrates the results of a sheet-passing test regarding a second embodiment described later.

In the image forming apparatus 100 of the comparative example in which the discharge device 27 is not provided, the increase in the volume resistivity of the intermediate transfer belt 6 after the start of the sheet-passing test is large. When the number of passed sheets exceeded 500 k, the volume resistivity of the intermediate transfer belt 6 became $1.0\times10^{12}$ Ω·cm or more, and a mesh-like abnormal image occurred in a red image (secondary color of yellow and magenta). This is a phenomenon caused by a difference in electric resistance between a portion where the conductive material (negative ions in this embodiment) is present and a portion where the conductive material is not present, which is sparse in the surface layer 6*c* side because the conductive material is unevenly distributed on the base layer 6*a* side of the elastic layer 6*b*. Furthermore, in the image forming apparatus 100 of the comparative example in which the discharge device 27 is not provided, sufficient transferability could not be maintained when the number of passed sheets was 1200 k. In the configuration of this embodiment, if the current balance is on the negative side due to the fluctuation of the output of the discharge power source E5, the electric resistance of the intermediate transfer belt 6 increases relatively early as in the comparative example, and the life of the intermediate transfer belt 6 may be shortened.

On the other hand, in the image forming apparatus 100 of this embodiment, if the current balance is set to +0.03 μA/mm by using the discharge device 27, the increase in the volume resistivity of the intermediate transfer belt 6 is suppressed to as low as $1.6\times10^{11}$ Ω·cm. In addition, in this embodiment, no mesh-like abnormal image occurred during the sheet-passing test. Furthermore, in this embodiment, sufficient transferability could be maintained until the number of passed sheets reached 2500 k, so that high durability of the intermediate transfer belt 6 could be achieved.

In this manner, in this embodiment, the image forming apparatus 100 includes: the image bearing member 1 that bears a toner image; the rotatable endless intermediate transfer belt 6 onto which the toner image is to be transferred from the image bearing member 1; the primary transfer member 5 that primarily transfers the toner image from the image bearing member 1 onto the intermediate transfer belt 6 by supplying the primary transfer current to the intermediate transfer belt 6 at the primary transfer portion N1; the secondary transfer member 9 that secondarily transfers the toner image from the intermediate transfer belt 6 onto the recording material P by supplying the secondary transfer current to the intermediate transfer belt 6 at the secondary transfer portion N2; the discharge member 271 that supplies the discharge current to the intermediate transfer belt 6 at the discharge portion D downstream of the secondary transfer portion N2 and upstream of the primary transfer portion N1 in the rotation direction of the intermediate transfer belt 6; the discharge power source E5 that supplies the discharge current; and the control unit 50 that can control the discharge power source E5. In this embodiment, Ia is the sum of positive currents, per unit length of the intermediate transfer belt 6 in the width direction in regions where the currents are supplied by the current supply members, supplied in the direction (inward directions) from the outer peripheral surface side to the inner peripheral surface side of the intermediate transfer belt 6 by the current supply members at the image forming time, Ib is the sum of positive currents, per unit length of the intermediate transfer belt 6 in the width direction in the regions where the currents are supplied by the current supply members, supplied in the direction (outward direction) from the inner peripheral surface side to the outer peripheral surface side of the intermediate transfer belt 6 by the current supply members at the image forming time, and the value of Ia−Ib is the current balance of the current supplied to the intermediate transfer belt 6. In the range where the electric resistance of the intermediate transfer belt 6 is less than or equal to a predetermined value, the relationship of the electric resistance of the intermediate transfer belt 6 with respect to the current balance satisfies the relationship of $|Sb|>|Sa|$, where Sa is the ratio of the change (above-described slope) in the electric resistance of the intermediate transfer belt 6 with respect to the change in the current balance in the range where the current balance is positive, and Sb is the ratio (above-described inclination) in the range where the current balance is negative. In addition, the control unit 50 controls the discharging power source E5 such that the average value of the current balance is a positive value when the image formation is continuously performed on a predetermined number of sheets of the recording material P during the job of continuous image formation. In other words, in this embodiment, the control unit 50 sets the discharge current such that the current balance approaches zero, and also sets the discharge current such that the current balance becomes a positive value.

In this embodiment, the image forming apparatus 100 includes a plurality of primary transfer members 5 along the rotation direction of the intermediate transfer belt 6. In addition, in this embodiment, the image forming apparatus 100 includes the cleaning members 122 and 123 that are current supply members and remove the toner from the intermediate transfer belt 6 by supplying the cleaning currents to the intermediate transfer belt 6 at the cleaning portions CL1 and CL2 downstream of the secondary transfer portion N2 and upstream of the primary transfer portion N1 in the rotation direction of the intermediate transfer belt 6. In this embodiment, the control unit 50 sets the discharge current such that the offset amount of the value of the discharge current with which the current balance becomes zero is greater than or equal to the fluctuation of the output of the discharge power source E5. In addition, in this embodiment, the image forming apparatus 100 includes the detecting units F1 and F2 that monitor the current balance, and the control unit 50 sets the discharge current on the basis of detection results of the detecting units F1 and F2. In this embodiment, the detecting units F1 and F2 detect at least the primary transfer current and the secondary transfer current. In this embodiment, the intermediate transfer belt 6 has ion conductivity. In particular, in this embodiment, the intermediate transfer belt 6 includes the elastic layer 6*b* containing the ion-conductive material. In addition, in this embodiment, $|Sb|$ is larger than twice $|Sa|$. Although not limited to this, $|Sb|$ is typically smaller than a value 10 times as large as $|Sa|$.

As described above, in this embodiment, the discharge current is set to be offset such that the current balance is on the positive side near zero. As a result, it is possible to suppress a sudden increase in the electric resistance of the intermediate transfer belt 6 due to the current balance being on the negative side. In addition, in this embodiment, this offset amount is greater than or equal to the fluctuation of the discharge current due to the fluctuation of the output of the discharge power source E5. As a result, even if the discharge current fluctuates due to the fluctuation of the output of the discharge power source E5, the current balance can be prevented from being on the negative side. Furthermore, in this embodiment, during execution of the print job, the current balance at the image forming time (more specifically, the primary transfer current, the secondary transfer current, and the first and second cleaning currents) is monitored, and the discharge current is controlled (changed) on the basis of the results. Accordingly, for example, even if the primary transfer current or the secondary transfer current changes depending on the presence or absence of toner, the discharge current can be set more appropriately, and the intermediate transfer belt 6 can be discharged more appropriately. Therefore, according to this embodiment, it is possible to suppress an increase in the electrical resistance of the intermediate transfer belt 6 by optimizing the discharge current.

Second Embodiment

Next, another embodiment of the present disclosure will be described. The basic configuration and operation of an image forming apparatus in this embodiment are the same as those of the image forming apparatus in the first embodiment. Therefore, in the image forming apparatus of this embodiment, elements having the same or corresponding functions or configurations as those of the image forming apparatus of the first embodiment are represented by the same reference numerals as those in the first embodiment and will be omitted from detailed description.

Figure 11:
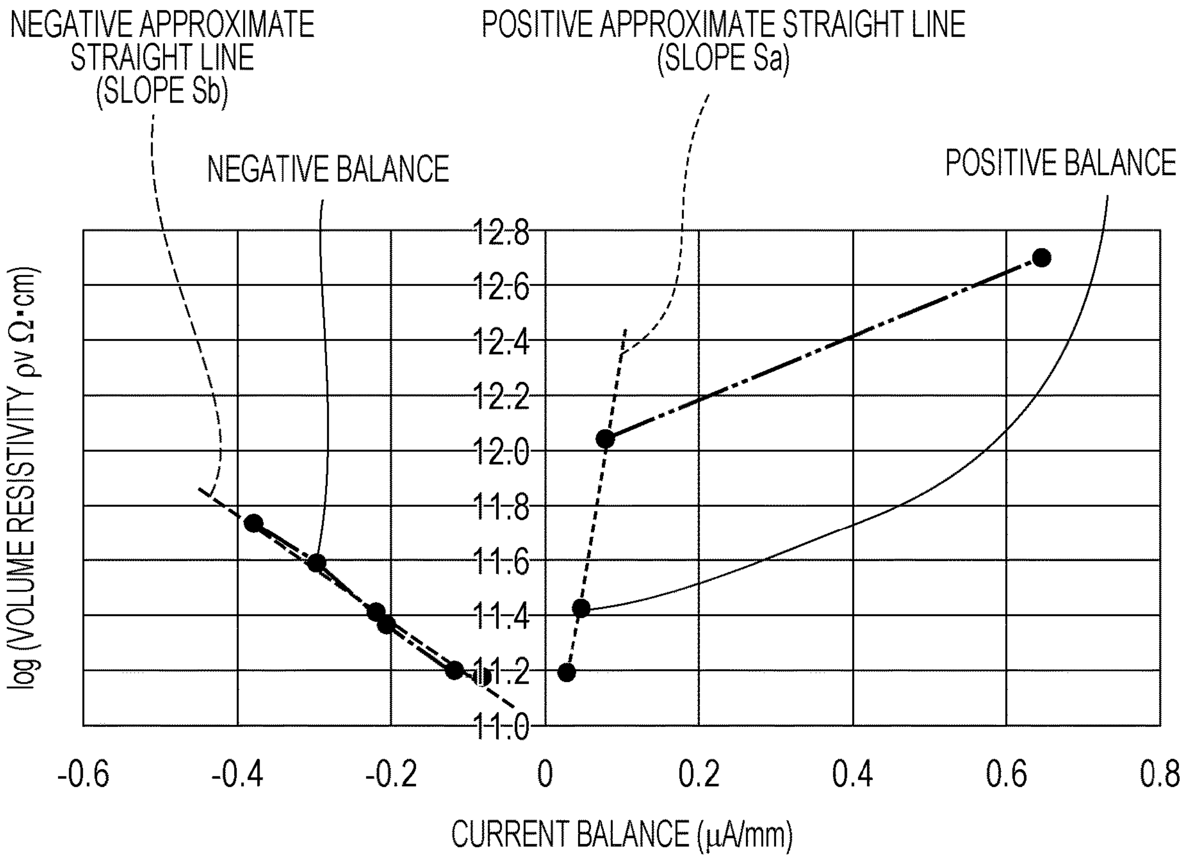
FIG. 11 is a graph illustrating another example of the relationship between the current balance and the electric resistance of the intermediate transfer belt.

In this example, a configuration will be described in which the relationship between the current balance and the volume resistivity as illustrated in FIG. 11 is obtained when a test is conducted by the measuring apparatus 200 illustrated in FIG. 5 described in the first embodiment. In other words, in this embodiment, in contrast to the first embodiment, the slope of the above relationship is steeper when the current balance is on the positive side, and the slope is gentler when the current balance is on the negative side. For example, in the example illustrated in FIG. 11, the absolute value $|Sa|$ of the slope Sa is about seven times as large as the absolute value |Sb| of the slope Sb. Depending on the type of the ion-conductive material contained in the elastic layer 6*b* of the intermediate transfer belt 6, the relationship of the steepness of the slope may differ between a region where the current balance is below zero and a region where the current balance is over zero. In the first embodiment, the ion-conductive material is an-ion conductive material in which negative ions easily move, but in this example, the ion-conductive material is considered to be a conductive material in which positive ions easily move.

In this manner, in the case of |Sa|>Sb|, the discharge current may be set such that the current balance is on the negative side near zero. In the image forming apparatus 100 of this embodiment, a sheet-passing test that is substantially the same as that described in the first embodiment was conducted in which the current balance was set to −0.03 μA/mm. As a result, as illustrated in FIG. 10, as in the case of the first embodiment, the increase in the volume resistivity of the intermediate transfer belt 6 was suppressed to as low as $1.6\times10^{11}$ Ω·cm, and no mesh-like abnormal image occurred during the sheet-passing test. Furthermore, sufficient transferability could be maintained until the number of passed sheets reached 2500 k, so that high durability of the intermediate transfer belt 6 could be achieved.

In the above manner, in this embodiment, during the job of continuous image formation, the control unit 50 controls the discharge power source E5 such that the average value of the current balance when the image formation is continuously performed on a predetermined number of sheets of the recording material P becomes a negative value. In other words, in this embodiment, the control unit 50 sets the discharge current such that the current balance approaches zero, and sets the discharge current such that the current balance becomes a negative value. In addition, in this embodiment, |Sa| is larger than twice |Sa|. Although not limited to this, |Sa| is typically smaller than a value 10 times as large as |Sb|.

As described above, also in the configuration of this embodiment, as in the first embodiment, it is possible to suppress an increase in the electrical resistance of the intermediate transfer belt 6 by optimizing the discharge current.

Miscellaneous

Although the present disclosure has been described above with reference to specific embodiments, the present disclosure is not limited to the above-described embodiments.

For example, the discharge member is not limited to the brush roller, and may be other forms such as a solid rubber roller, a sponge rubber roller, a metal roller, a sheet, a film, and a pad. The same applies to the primary transfer member, the secondary transfer member, and the cleaning member.

In addition, the control of the discharge voltage is not limited to constant current control. The target value of the discharge current may be set as in the above-described embodiments, a voltage value when the current of the target value flows may be obtained, and the discharge voltage may be subjected to constant voltage control so as to be substantially constant at the voltage value. The same applies to the cleaning voltage, and the control of the cleaning voltage is not limited to constant current control and may be constant voltage control. Similarly, the control of the primary transfer voltage and the secondary transfer voltage is not limited to constant voltage control, and at least one of the primary transfer voltage and the secondary transfer voltage may be subjected to constant current control. In a case where the primary transfer voltage and the secondary transfer voltage are subjected to constant current control, these target values may be used for obtaining the discharge current.

According to the present disclosure, it is possible to suppress an increase in the electric resistance of the intermediate transfer belt even if the output value varies due to the individual difference of the discharge power source.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described Embodiments and/or that includes one or more circuits (e.g., application specific integrated circuit (ASIC)) for performing the functions of one or more of the above-described Embodiments, and by a method performed by the computer of the system or apparatus by, for example, reading out and executing the computer executable instructions from the storage medium to perform the functions of one or more of the above-described Embodiments and/or controlling the one or more circuits to perform the functions of one or more of the above-described Embodiments. The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-102271, filed Jun. 24, 2022, which is hereby incorporated by reference herein in its entirety.

What is claimed is:

1. An image forming apparatus comprising:

an image bearing member configured to bear a toner image;

an intermediate transfer belt that is rotatable, endless, and onto which the toner image is to be transferred from the image bearing member; and a plurality of current supply devices capable of supplying currents to the intermediate transfer belt, wherein the plurality of current supply devices includes:

a first current supply device including a primary transfer member configured to primarily transfer the toner image from the image bearing member onto the intermediate transfer belt by supplying a primary transfer current to the intermediate transfer belt at a primary transfer portion, a first power source configured to apply a voltage to the primary transfer member, and a first detecting unit configured to detect a current supplied from the first power source;

a second current supply device including a secondary transfer member configured to secondarily transfer the toner image from the intermediate transfer belt onto a recording material by supplying a secondary transfer current to the intermediate transfer belt at a secondary transfer portion, a second power source configured to apply a voltage to the secondary transfer member, and a second detecting unit configured to detect a current supplied from the second power source;

a third current supply device including a discharge member configured to supply a discharge current to the intermediate transfer belt at a discharge portion downstream of the secondary transfer portion and upstream of the primary transfer portion in a rotation direction of the intermediate transfer belt, a third power source configured to supply a current to the discharge member, and a third detecting unit configured to detect the current supplied from the third power source; and a control unit configured to control the plurality of current supply devices, wherein, among currents supplied by the plurality of current supply devices at an image forming time, if Ia is a sum of current densities of positive currents, per unit length of the intermediate transfer belt in a width direction in regions where the currents are supplied by the plurality of current supply devices at the image forming time, supplied in a direction from an outer peripheral surface side of the intermediate transfer belt to an inner peripheral surface side of the intermediate transfer belt, Ib is a sum of current densities of positive currents, per unit length of the intermediate transfer belt in the width direction in the regions where the currents are supplied by the plurality of current supply devices at the image forming time, supplied in a direction from the inner peripheral surface side to the outer peripheral surface side of the intermediate transfer belt, and a value of Ia−Ib is a value of a current balance of a current supplied to the intermediate transfer belt, an electric resistance of the intermediate transfer belt with respect to the current balance is larger when the value of the current balance is a negative value of a predetermined value than when the value of the current balance is a positive value of the predetermined value, and wherein, during execution of a print job of continuous image formation in which the toner image is continuously transferred onto a plurality of recording materials, the control unit performs constant current control on the discharge current such that, based on a detection result detected by the first detecting unit during the print job and a detection result detected by the second detecting unit during the print job, the current balance is positive.

2. The image forming apparatus according to claim 1, wherein, a relationship of a volume resistivity of the intermediate transfer belt with respect to the current balance satisfies a relationship of |Sb|>Sa|, where |Sb| is larger than twice |Sa|, Sa is a ratio of a change in the electric resistance of the intermediate transfer belt with respect to a change in the current balance in a range where the current balance is positive, and Sb is a ratio of a change in the electric resistance of the intermediate transfer belt with respect to a change in the current balance in a range where the current balance is negative.

3. The image forming apparatus according to claim 1, wherein the primary transfer member includes a plurality of primary transfer members along the rotation direction of the intermediate transfer belt.

4. The image forming apparatus according to claim 1, wherein the plurality of current supply devices further includes a cleaning member configured to remove toner from the intermediate transfer belt by supplying a cleaning current to the intermediate transfer belt at a cleaning portion downstream of the secondary transfer portion and upstream of the primary transfer portion in the rotation direction of the intermediate transfer belt.

5. The image forming apparatus according to claim 1, wherein the discharge current is a current of +2.5% or more of a target current value of the discharge current with which the current balance becomes 0 microampere per millimeter (μA/mm).

6. The image forming apparatus according to claim 1, wherein an offset amount of a value of the discharge current with which the current balance becomes zero is a current of 30% or less of a target current value of the discharge current with which the current balance becomes 0 microampere per millimeter (μA/mm).

7. The image forming apparatus according to claim 1, wherein an offset amount of a value of the discharge current with which the current balance becomes zero is a current of 10% or less of a target current value of the discharge current with which the current balance becomes 0 microampere per millimeter (μA/mm).

8. The image forming apparatus according to claim 1, wherein the control unit is configured to set the discharge current such that an offset amount of a value of the discharge current with which the current balance becomes zero is greater than or equal to fluctuation of an output of the third power source.

9. The image forming apparatus according to claim 1, wherein the intermediate transfer belt includes an elastic layer containing an ion-conductive material.

10. The image forming apparatus according to claim 1, wherein the control unit is configured to control the first power source and the second power source such that the voltages applied by the first and second power sources are subjected to constant voltage control.

11. An image forming apparatus comprising:

an image bearing member configured to bear a toner image;

an intermediate transfer belt that is rotatable, endless, and onto which the toner image is to be transferred from the image bearing member; and a plurality of current supply devices capable of supplying currents to the intermediate transfer belt, wherein the plurality of current supply devices includes:

a first current supply device including a primary transfer member configured to primarily transfer the toner image from the image bearing member onto the intermediate transfer belt by supplying a primary transfer current to the intermediate transfer belt at a primary transfer portion, a first power source configured to apply a voltage to the primary transfer member, and a first detecting unit configured to detect a current supplied from the first power source;

a second current supply device including a secondary transfer member configured to secondarily transfer the toner image from the intermediate transfer belt onto a recording material by supplying a secondary transfer current to the intermediate transfer belt at a secondary transfer portion, a second power source configured to apply a voltage to the secondary transfer member, and a second detecting unit configured to detect a current supplied from the second power source;

a third current supply device including a discharge member configured to supply a discharge current to the intermediate transfer belt at a discharge portion downstream of the secondary transfer portion and upstream of the primary transfer portion in a rotation direction of the intermediate transfer belt, a third power source configured to supply a current to the discharge member, and a third detecting unit configured to detect the current supplied from the third power source; and a control unit configured to control the plurality of current supply devices, wherein, among currents supplied by the plurality of current supply devices at an image forming time, if Ia is a sum of current densities of positive currents, per unit length of the intermediate transfer belt in a width direction in regions where the currents are supplied by the plurality of current supply devices at the image forming time, supplied in a direction from an outer peripheral surface side of the intermediate transfer belt to an inner peripheral surface side of the intermediate transfer belt, Ib is a sum of current densities of positive currents, per unit length of the intermediate transfer belt in the width direction in the regions where the currents are supplied by the plurality of current supply devices at the image forming time, supplied in a direction from the inner peripheral surface side to the outer peripheral surface side of the intermediate transfer belt, and a value of Ia−Ib is a value of a current balance of a current supplied to the intermediate transfer belt, during execution of a print job of continuous image formation in which the toner image is continuously transferred onto a plurality of recording materials, the control unit performs constant current control on the discharge current such that, based on a detection result detected by the first detecting unit during the print job and a detection result detected by the second detecting unit during the print job, the current balance is positive.

12. The image forming apparatus according to claim 11, wherein, a relationship of a volume resistivity of the intermediate transfer belt with respect to the current balance satisfies a relationship of |Sb|>Sa|, where |Sb| is larger than twice |Sa|, Sa is a ratio of a change in the electric resistance of the intermediate transfer belt with respect to a change in the current balance in a range where the current balance is positive, and Sb is a ratio of a change in the electric resistance of the intermediate transfer belt with respect to a change in the current balance in a range where the current balance is negative.

13. The image forming apparatus according to claim 11, wherein the primary transfer member includes a plurality of primary transfer members along the rotation direction of the intermediate transfer belt.

14. The image forming apparatus according to claim 11, wherein the plurality of current supply devices further includes a cleaning member configured to remove toner from the intermediate transfer belt by supplying a cleaning current to the intermediate transfer belt at a cleaning portion downstream of the secondary transfer portion and upstream of the primary transfer portion in the rotation direction of the intermediate transfer belt.

15. The image forming apparatus according to claim 11, wherein the discharge current is a current of +2.5% or more of a target current value of the discharge current with which the current balance becomes 0 microampere per millimeter (μA/mm).

16. The image forming apparatus according to claim 11, wherein an offset amount of a value of the discharge current with which the current balance becomes zero is a current of 30% or less of a target current value of the discharge current with which the current balance becomes 0 microampere per millimeter (μA/mm).

17. The image forming apparatus according to claim 11, wherein an offset amount of a value of the discharge current with which the current balance becomes zero is a current of 10% or less of a target current value of the discharge current with which the current balance becomes 0 microampere per millimeter (μA/mm).

18. The image forming apparatus according to claim 11, wherein the control unit is configured to set the discharge current such that an offset amount of a value of the discharge current with which the current balance becomes zero is greater than or equal to fluctuation of an output of the third power source.

19. The image forming apparatus according to claim 11, wherein the intermediate transfer belt includes an elastic layer containing an ion-conductive material.

20. The image forming apparatus according to claim 11, wherein the control unit is configured to control the first power source and the second power source such that the voltages applied by the first and second power sources are subjected to constant voltage control.

21. An image forming apparatus comprising:

an image bearing member configured to bear a toner image;

an intermediate transfer belt that is rotatable, endless, and onto which the toner image is to be transferred from the image bearing member; and a plurality of current supply devices capable of supplying currents to the intermediate transfer belt, wherein the plurality of current supply devices includes:

a first current supply device including a primary transfer member configured to primarily transfer the toner image from the image bearing member onto the intermediate transfer belt by supplying a primary transfer current to the intermediate transfer belt at a primary transfer portion, a first power source configured to apply a voltage to the primary transfer member, and a first detecting unit configured to detect a current supplied from the first power source;

a second current supply device including a secondary transfer member configured to secondarily transfer the toner image from the intermediate transfer belt onto a recording material by supplying a secondary transfer current to the intermediate transfer belt at a secondary transfer portion, a second power source configured to apply a voltage to the secondary transfer member, and a second detecting unit configured to detect a current supplied from the second power source;

a third current supply device including a discharge member configured to supply a discharge current to the intermediate transfer belt at a discharge portion downstream of the secondary transfer portion and upstream of the primary transfer portion in a rotation direction of the intermediate transfer belt, a third power source configured to supply a current to the discharge member, and a third detecting unit configured to detect the current supplied from the third power source; and a control unit configured to control the plurality of current supply devices, wherein, among currents supplied by the plurality of current supply devices at an image forming time, if Ia is a sum of current densities of positive currents, per unit length of the intermediate transfer belt in a width direction in regions where the currents are supplied by the plurality of current supply devices at the image forming time, supplied in a direction from an outer peripheral surface side of the intermediate transfer belt to an inner peripheral surface side of the intermediate transfer belt, Ib is a sum of current densities of positive currents, per unit length of the intermediate transfer belt in the width direction in the regions where the currents are supplied by the plurality of current supply devices at the image forming time, supplied in a direction from the inner peripheral surface side to the outer peripheral surface side of the intermediate transfer belt, and a value of Ia−Ib is a value of a current balance of a current supplied to the intermediate transfer belt, an electric resistance of the intermediate transfer belt with respect to the current balance is larger when the value of the current balance is a positive value of a predetermined value than when the value of the current balance is a negative value of the predetermined value, and wherein, during execution of a print job of continuous image formation in which the toner image is continuously transferred onto a plurality of recording materials, the control unit performs constant current control on the discharge current such that, based on a detection result detected by the first detecting unit during the print job and a detection result detected by the second detecting unit during the print job, the current balance is negative.

22. The image forming apparatus according to claim 21, wherein the intermediate transfer belt includes an elastic layer containing an ion-conductive material.

23. The image forming apparatus according to claim 21, wherein the control unit is configured to control the first power source and the second power source such that the voltages applied by the first and second power sources are subjected to constant voltage control.

* * * * *